US007497285B1

(12) United States Patent
Radev

(10) Patent No.: US 7,497,285 B1
(45) Date of Patent: Mar. 3, 2009

(54) HYBRID ELECTRIC VEHICLE

(76) Inventor: Vladimir Radev, 18 Chancellor Park Dr., Mays Landing, NJ (US) 08330-2049

( * ) Notice: Subject to any disclaimer, the term of this patent is extended or adjusted under 35 U.S.C. 154(b) by 0 days.

(21) Appl. No.: 11/984,234

(22) Filed: Nov. 15, 2007

(51) Int. Cl.
*B60K 1/00* (2006.01)

(52) U.S. Cl. ............... 180/65.2; 180/65.3; 180/65.4; 180/65.6; 180/69.6; 903/916; 903/921; 903/922; 903/902

(58) Field of Classification Search ....... 180/65.2–65.4, 180/65.6, 69.6; 903/902, 916, 921, 922
See application file for complete search history.

(56) References Cited

U.S. PATENT DOCUMENTS

| | | | | |
|---|---|---|---|---|
| 5,804,935 | A * | 9/1998 | Radev | 318/139 |
| 6,005,358 | A * | 12/1999 | Radev | 318/139 |
| 6,340,847 | B1 * | 1/2002 | Kawabata et al. | 290/40 C |
| 6,427,797 | B1 * | 8/2002 | Chang | 180/247 |
| 6,520,879 | B2 * | 2/2003 | Kawabata et al. | 475/5 |
| 6,615,946 | B2 * | 9/2003 | Pasquini et al. | 180/248 |
| 7,134,180 | B2 * | 11/2006 | Hsu | 29/596 |
| 7,240,751 | B2 * | 7/2007 | Hoare et al. | 180/65.4 |
| 2002/0115516 | A1 * | 8/2002 | Kawabata et al. | 475/5 |
| 2003/0019674 | A1 * | 1/2003 | Duan | 180/65.3 |
| 2006/0196714 | A1 * | 9/2006 | Sugimoto et el. | 180/242 |
| 2006/0249319 | A1 * | 11/2006 | Hoare et al. | 180/65.4 |

* cited by examiner

*Primary Examiner*—Christopher P Ellis
*Assistant Examiner*—Jacob Meyer

(57) ABSTRACT

At speeds of the vehicle lower than a predetermined speed, two rotors (19, 20) of a dual-rotor motor (17), rotating in opposite directions under the action of the same electromagnetic forces, drive the wheels (12, 13, 15, 16) of two drive axles (11, 14) respectively, driving the vehicle in a low-speed/four-wheel-drive mode, while an internal-combustion engine (45) drives an electric generator (52) or rests. The generator powers the dual-rotor motor, or charges an electric battery (56), or both. At speeds higher than the predetermined speed, the engine driving the generator also drives the wheels (12, 13) of the first drive axle (11), whereas under normal load the dual-rotor motor does not operate and the engine alone drives the vehicle in a high-speed/two-wheel drive mode, while under heavy load the dual-rotor motor, powered by the battery, operates and together with the engine drive the vehicle in a high-speed/four-wheel-drive mode. A clutch (51) selectively interrupts the power transmission between the engine and first drive axle. The dual-rotor motor selectively operates as a braking generator during speed retardation and braking of the vehicle. A central electronic controller (64) controls the operation of the clutch, dual-rotor motor, and engine for achieving high fuel efficiency and performance of the vehicle.

24 Claims, 9 Drawing Sheets

HYBRID ELECTRIC VEHICLE

FIELD OF THE INVENTION

This invention relates generally to self-propelled four-wheeled vehicles, and more particularly to hybrid electric vehicles.

BACKGROUND OF THE INVENTION

The term "hybrid electric vehicle" is usually used in the art to indicate a four-wheeled vehicle with a drive system including an internal-combustion engine and at least one electric traction motor. The term "electric traction motor" is used to distinguish an electric motor utilized for vehicle propulsion from all other electric motors that may be employed in a vehicle. Hereinafter, the shorter term "traction motor" is also frequently used to indicate an electric traction motor.

The sources of electric energy for the electric traction motor(s) are usually an electric generator driven by the internal-combustion engine, and an electric traction battery charged by the electric generator. In some hybrid electric vehicles, the electric traction battery is also arranged to be charged by an external source of electric energy when the vehicle is parked. The term "electric traction battery" is used to distinguish the large high-voltage electric battery used for powering the electric traction motor(s) from the standard low-voltage electric battery, which powers the other electric system of the vehicle. Hereinafter, for abbreviation, the shorter terms "electric battery" and "generator" are frequently used instead of the terms "electric traction battery" and "electric generator" respectively.

The Internal-Combustion Engine

It is well known that an ideal source of mechanical energy for propulsion of an automotive vehicle would be a machine providing a constant power output throughout its entire speed range. Such a characteristic of the power output corresponds to a hyperbolic characteristic of the torque output. A source of mechanical energy with such characteristics would provide large torque at relatively low vehicle speeds, i.e., exactly when large tractive force, and therefore large torque, is demanded for starting the motion, accelerating, and uphill driving. In this regard, of all possible power sources for automotive vehicles, the internal-combustion engine has the most unfavorable power-torque characteristics. The internal-combustion engine cannot run and produce useful power below a certain minimum (idle) engine speed. It has to be started by another source of mechanical energy—usually by an electric motor. The power and torque output of an internal-combustion engine are relatively low at low engine speeds. The optimum combustion quality is reached at some medium engine speed where, consequently, the maximum engine torque is developed. The engine speed at maximum torque coincides approximately to the engine maximum fuel-efficiency speed. Generally, the fuel efficiency of the internal-combustion engines is relatively low when the engine operates near the low end or near the high end of its entire rotational speed range. Somewhere in between, depending on the specific type and design of the engine, is the engine high fuel-efficiency speed range.

Because of these unfavorable power-torque characteristics, the internal-combustion engine is used in the conventional automotive drive systems in conjunction with a frictional clutch and a manual gear-shift transmission, or with a hydrodynamic coupling (or torque converter) and an automatic gear-shift transmission or a continuously-variable-speed transmission. The transmission enables the engine to operate more or less close to the engine optimum fuel-efficiency speed at different vehicle speeds, and particularly during the most frequently used part of the entire vehicle speed range. Other disadvantages of the internal-combustion engine are the significant drop of the engine efficiency under conditions of part-load operation, and the production of environmentally harmful exhaust emissions. Paradoxically, in spite of all its disadvantages, the internal-combustion engine is the source of mechanical power in the vast majority of the automobiles worldwide, due principally to its excellent operational readiness, high power-to-weight ratio, wide availability of fuel, and quick refueling capability.

The Electric Traction Motor

In contrast to the power-torque characteristics of the internal-combustion engine, the power-torque characteristics of the electric traction motors are the most favorable for propelling automotive vehicles. Contemporary electric traction motors are capable of providing the maximum motor torque from standstill up to a certain speed of the motor, and the maximum motor power from that point up to the maximum speed of the motor. Furthermore, most of the electric traction motors can be briefly overloaded up to 2 or 3 times of their continuous-power rating. The mechanical drive train from the rotor of the electric traction motor to the wheels of a drive axle is usually simple and efficient. The control of the continuously variable tractive force of the vehicle is also relatively simple. Nevertheless, in spite of its many advantages, including its environmentally clean operation, the electric vehicle drive still has limited applications, mainly because of the relatively low energy-storage capacity of the contemporary electric batteries in ratio to their weight and size, and the long battery charging time.

The Hybrid Electric Vehicle

The fundamental goal in the development of hybrid electric vehicles is to combine the two sources of mechanical energy—the internal combustion engine and the electric traction motor—so that the advantages of each of them are utilized under varying operating conditions in such a manner that the improvement in fuel efficiency, improvement of performance characteristics, reduction of exhaust emissions of harmful substances, and other advantages justify the higher cost of the hybrid vehicles. The main difference between various hybrid electric vehicles is the series or parallel arrangement of the sources of mechanical energy within the power train of the vehicle.

The Series Hybrid Electric Vehicle

In the series hybrid electric vehicles, the internal-combustion engine, operating at a substantially constant speed in the vicinity of its optimum speed in terms of fuel efficiency and emissions, drives the electric generator, which, in its turn, charges the electric battery and supplies the electric traction motor with electric energy. In this arrangement, only the electric traction motor drives the wheels of the vehicle via an appropriate drive train. The direction of rotation of the rotor of the traction motor is reversible for selectively driving the vehicle in reverse.

As far as the driving of the vehicle is concerned, the series hybrid electric vehicle operates as an electric vehicle, because the internal-combustion engine is not mechanically connected with the drive train of the vehicle. The operation of the traction motor is controlled by an electric traction motor controller. The operator of the vehicle controls the continuously variable tractive force of the vehicle by varying the depression of the accelerator pedal, which is appropriately connected with the traction motor controller.

The internal-combustion engines of the series hybrid electric vehicles are usually narrow-speed-range machines with higher fuel efficiency than that of the comparable engines with wider speed range used in the conventional vehicles. The efficient narrow-speed-range internal-combustion engine, operating at substantially constant speed within the engine optimum speed range, in terms of fuel-efficiency and exhaust emissions, is the major advantages of the series arrangement. The simplicity of the mechanical drive, and the simple and direct control of the continuously-variable tractive force of the vehicle are the other major advantages of the series arrangement.

On the other hand, because the mechanical energy generated by the engine must be converted several times during the entire operational cycle of the vehicle the total efficiency of the power train of a series hybrid electric vehicle may be lower than that of a conventional vehicle. Another major disadvantage of the series hybrid electric vehicle is that the combined power of the internal-combustion engine and the electric traction motor cannot be used during high power demand. In the series arrangement, the electric traction motor, and consequently the entire electric power train, must be large enough to be able to drive the vehicle and meet the performance requirements within the complete speed range of the vehicle.

A series arrangement is justifiable in relatively low-speed vehicles with frequent stop-and-go duty cycles, such as city buses, mail and parcels delivery vehicles for city operations, and other similar frequent stop-and-go vehicles operating in densely populated areas. In such vehicles the electric traction motor and, when the electric traction battery is sufficiently charged, the internal-combustion engine do not operate during the time of the frequent stops. In these vehicles, usually the electric generator is also arranged to selectively operate as an electric motor for starting the internal-combustion engine, while the electric traction motor is also arranged to selectively operate as an electric braking generator for converting part of the kinetic energy of the vehicle into electric energy, charging the electric battery, during speed retardation or braking of the vehicle. Thus, the energy that is regenerated during frequent braking and the energy that is saved during frequent stops may outweigh the losses from the conversions of the energy within the power train. Furthermore, the related environmental benefits may outweigh concerns about the higher initial cost of the hybrid electric vehicle in comparison with the cost of an equivalent conventional vehicle driven by an internal-combustion engine.

Some examples of series hybrid electric vehicles are disclosed in U.S. Pat. Nos. 4,306,156 Monaco et al; 4,313,080 Park; 4,354,144 McCarthy; 4,533,011 Heidemeyer, and 4,951,769 Kawamura.

The Parallel Hybrid Electric Vehicle

In the known parallel hybrid electric vehicles, typically, the internal-combustion engine, operating at continuously variable torque-speed output, drives the electric generator, which, in its turn, charges the electric battery and supplies the electric traction motor with electric energy. At the same time, the internal-combustion engine drives the two wheels of a drive axle through a hydrodynamic coupling (torque converter), an automatic gear-shift transmission or a continuously-variable-speed transmission, and the final drive and differential of the drive axle. The electric traction motor is usually mechanically connected in parallel with the internal-combustion engine for driving the wheels of the drive axle alone, or together with the internal-combustion engine when more power is demanded. Typically, the electric generator is also arranged to selectively operate briefly as an electric motor for starting the internal-combustion engine, and the electric traction motor is also arranged to selectively operate as an electric braking generator for recovering part of the kinetic energy of the vehicle during speed retardation or braking.

The major advantage of the parallel arrangement is that, at high power demand, the combined power outputs of the internal-combustion engine and electric traction motor are utilized to drive the vehicle. Therefore, the internal-combustion engine may be substantially smaller in size and power than the internal-combustion engine of a comparable conventional vehicle, and the electric traction motor may be substantially smaller in size and power than the traction motor in a comparable electric vehicle or in a comparable series hybrid electric vehicle.

Different types of parallel arrangements are known, some of which are already incorporated in production hybrid electric vehicles.

Hereinafter, for abbreviation, the short term "engine" is frequently used instead of the terms "internal-combustion engine".

Parallel Arrangement with One Electric Machine

In some of the known parallel hybrid electric vehicles, an electric machine is mechanically coupled with the output shaft of the engine. The electric machine selectively operates as an electric starter motor, or a generator, or a traction motor. The mechanical energy from the engine and from the electric machine, when it operates as a traction motor, is transmitted to the drive axle of the vehicle through a conventional torque converter and a conventional automatic multi-speed gear-shift transmission. At normal-load operation, the engine drives the vehicle and the rotor of the electric machine, which, operating as an electric generator charges an electric battery. At heavy-load operation, the engine and the electric machine, operating as a traction motor, drive the vehicle. When the electric machine operates as a traction motor or as a starter motor, it is powered by the battery. The backward motion of the vehicle is achieved through the reverse gear of the transmission. In such a parallel arrangement, the control of the continuously variable tractive force of the vehicle is relatively simple. On the other hand, since the engine operates continuously and within the entire engine speed range, and the mechanical energy is transmitted through a torque converter and a conventional automatic gear-shift transmission, the total fuel efficiency is just as high as that of a conventional vehicle. The only advantage of this arrangement is the improved performance, due to the additional power from the electric traction motor at high power demand. It is, however, questionable whether the improved performance would justify the higher cost of such type hybrid electric vehicles.

In other parallel hybrid electric vehicles the mechanical energy from the internal-combustion engine is transmitted towards the drive axle through conventional torque converter and automatic multi-speed gear-shift transmission. An electric machine is mechanically coupled with the output shaft of the transmission. The electric machine is arranged to selectively operate as a traction motor powered by an electric battery, for helping the internal-combustion engine during high power demand, or as a generator driven by the engine, for charging the electric battery during normal-load operation, or as an electric braking generator, for converting part of the kinetic energy of the vehicle into electric energy and charging the battery during speed retardation or braking of the vehicle. This parallel electric hybrid configuration has better transmission efficiency than the parallel arrangement described above, because the mechanical energy from the traction motor does not pass through the torque converter and the automatic gear-shift transmission. In addition, here, electric braking with recovery of electric energy is possible. But this arrangement requires more complicated control, capable of coordinating the operation of the engine and automatic transmission with the operation of the traction motor throughout the complete speed range of the vehicle. The major advantage of a hybrid vehicle of this kind is the improvement of the performance during high power demand, in comparison with the performance of a conventional vehicle having the same internal-combustion engine, torque converter, and automatic gear-shift transmission. As with the parallel arrangement described above, the improved performance characteristics and fuel efficiency may not be sufficient enough to justify the higher cost of such type hybrid electric vehicles.

Parallel Arrangement with Two Electric Machines

The power plants of other parallel hybrid electric vehicles incorporate two electric machines, an electric generator arranged also to selectively operate as an electric motor for starting the engine, and an electric traction motor arranged also to selectively operate as an electric braking generator for converting part of the kinetic energy of the vehicle into electric energy and charging the electric battery during speed retardation or braking of the vehicle. Most of the contemporary hybrid electric automobiles and particularly the hybrid electric passenger cars are of this kind. In these vehicles, the engine continuously drives the generator, which charges the battery and provides electric power for the electric traction motor, as well as for the other electric components and systems on board the vehicle.

Mechanical energy from the internal-combustion engine is transmitted to the wheels of a drive axle trough a hydrodynamic coupling (or torque converter), an automatic gear-shift transmission or a mechanical continuously-variable-speed transmission, and the final drive and differential of the drive axle. The output shaft of the electric traction motor is mechanically connected with the drive train between the transmission and the drive axle for transmitting mechanical energy from the electric motor to the wheels of the drive axle. The electric motor selectively drives the wheels of the drive axle alone or in parallel with the engine. During vehicle speed retardation or braking, the kinetic energy from the wheels of the drive axle drives the rotor of the electric traction motor, which, now operating as an electric braking generator, converts part of the kinetic energy into electricity and charges the battery. This kind of hybrid electric vehicle has the advantage that while the engine and the electric motor (alternately or jointly) provide propulsion of the vehicle, the electric generator, driven by the engine, continually generates electric energy for powering the electric traction motor when the traction motor is operating, and for charging the battery, when the battery is not sufficiently charged. In such a parallel arrangement the traction motor alone, powered by the battery, can drive the vehicle at low-speed/normal-load conditions, if the traction motor is powerful enough, until the battery is discharged to a specified level. The vehicle is driven in reverse only by the traction motor, whose direction of rotation is reversible. In this arrangement, while driving the vehicle, the engine operates within its entire rotational speed range, from its idle speed to its maximum speed, and the mechanical energy from the engine is transmitted to the wheels of the drive axle through expensive and energy-consuming torque converter and automatic gear-shift transmission. That is why the fuel economy and exhaust emissions reduction of this type hybrid electric vehicle may not be substantial enough to compensate for its significantly higher cost in comparison with that of the conventional vehicles of the same class.

The parallel hybrid electric vehicles having a torque converter and an automatic gear-shift transmission included in their power train have not achieved wide application, generally because they are relatively very expensive and the improvement of the total fuel-efficiency in comparison to that of the conventional vehicle of the same class is insignificant.

Some examples of parallel hybrid electric vehicles of the types discussed above are disclosed in U.S. Pat. Nos. 3,566,717 Berman at al; 3,732,751 Berman et al; 4,165,795 Lynch et al; 4,305,254 Kawakatsu; 4,335,429 Kawakatsu; 4,405,029 Hunt; 4,407,132 Kawakatsu; 4,578,955 Medina; 5,117,931 Nishida; 5,120,282 Fjallstrom; 5,343,970 Severinsky; 5,586,613 Ehsani; 5,667,029 Urban et al; 5,704,440 Urban et al; 5,823,280 Lateur; 5,842,534 Frank; 5,845,731 Buglione et al; 6,018,198 Tsuzuki et al; 6,018,694 Egami et al; 6,209,672 Severinsky; 7,210,546 Kuang et al, and 7,214,156 Oliver.

Parallel Arrangement with a Planetary-Gear-Type Mechanical-Energy-Mixing Device

A significant reduction of cost and improvement in fuel efficiency have been achieved in a parallel hybrid drive system by replacing the torque converter and automatic gear-shift transmission with a planetary-gear-type mechanical-energy-mixing device, known also as "power-split" or "power-distribution" device. Examples of hybrid electric vehicle with such a planetary-gear-type mechanism, mixing the flows of mechanical energy between the internal-combustion engine, generator, traction motor, and driving wheels of the vehicle are disclosed in U.S. Pat. Nos. 5,865,263 Yamaguchi et al, and 5,899,286 Yamaguchi et al.

In the Toyota Hybrid System (THS) (See: Yamaguchi, *Automotive Engineering*, July 1997, pp 55-58), the internal-combustion engine, the electric generator, the electric traction motor, and the planetary-gear-type device are coaxial, and are transversely located over the front axle of the vehicle. The planetary-gear-type device is sandwiched between the electric generator and the electric traction motor. The output shaft of the engine is coupled with the carrier of the planet gears, the shaft of the generator is coupled with the sun gear, and the shaft of the traction motor is coupled with the ring gear of the planetary-gear-type device. Thus, the shafts of the three major components of the hybrid power plant are mechanically connected, and the rotational behavior (speed and torque) of each of these components is directly related to the rotational behavior of each of the other two components. The mechanical energy is transmitted from the ring gear of the planetary-gear-type device to the wheels of the drive axle of the vehicle through a rigid drive train, including a two-stage gear speed reducer, an axle final drive and differential, and the axle wheels drive shafts. The planetary-gear-type device, gear speed reducer, and axle final drive and differential are integrated as a transaxle within a common enclosure. In this arrangement, as in most hybrid electric vehicles, the electric generator is arrange to selectively operate briefly as an electric starter motor for starting the engine, and the electric traction motor is arranged to selectively operate as an electric braking generator for speed retardation and braking of the vehicle with recovery of energy, which is often described as "regenerative braking". The reverse motion of the vehicle is achieved by reversal of the direction of rotation of the electric traction motor. In this arrangement, the planetary-gear-type device acts as a continuously variable speed transmission. Overall the mechanics of this arrangement is simple and efficient. On the other hand, the control of the tractive force by the accelerator pedal and the control of the braking force by the brake pedal are not direct, instant, and linear, because the continuously variable tractive and electric braking forces of the vehicle depend on the rotational behavior of the three power-generating components, connected mechanically by the planetary-gear-type device. In this arrangement, the electronics must continuously monitor and process a large number of variable parameters and must control and coordinating simultaneously the rotational behavior of the engine, generator, and traction motor with the depression of the accelerator or brake pedal respectively for achieving the desired tractive or electric braking force respectively. The system employs a very complicated and powerful electronics, and yet the regulation of the tractive and electric braking forces is not direct, instant, and linear. As a consequence, the performance of this type parallel hybrid is more or less inferior in comparison to the performance of the conventional vehicle of the same category. This is a major disadvantage of the Toyota Hybrid System.

For providing relatively safe electric braking with recovery of energy, most types of the two-wheel-drive parallel hybrid electric automobiles are front-engine front-wheel-drive vehicles. During the electric braking, the kinetic energy of the vehicle is transmitted to the traction motor only from the front wheels of the vehicle, and therefore the electric braking force is limited only by the part of the vehicle weight which is distributed upon the front wheels. This is a major disadvantage of all front-wheel-drive vehicles having electric regenerative braking.

A modification of the described above Toyota Hybrid System (THS) is a front-engine rear-wheel-drive configuration (THS-II). In this arrangement, the internal-combustion engine is located longitudinally near to the front of the vehicle. The connections between the internal-combustion engine, electric generator, planetary-gear-type mechanical-energy-mixing device, and electric traction motor, are generally the same as described above with the Toyota front-wheel-drive arrangement (THS). In addition, via a two-speed reducer, this system provides two reduction ratios appropriate respectively for lower-speed/higher-torque or higher-speed/lower-torque operation of the vehicle. The system also provides manual selection of several different speed ranges of the internal-combustion engine. A major problem in this arrangement is the control of the tractive and electric braking forces, which problem is similar as discussed above with the Toyota front-wheel-drive arrangement (THS), but is even more complicated. In addition, the electric regenerative braking capability of this rear-wheel-drive vehicle is quite limited. Here, the electric braking force is transmitted to rear wheels of the vehicle. For safe braking of the vehicle, this electric braking with recovery of energy may be employed only at good road driving conditions. The vehicle electronics must recognize any potential factors for unsafe rear-wheel electric braking and instantly revert to braking with the conventional vehicle wheel brakes. The limited capacity and complicated control of the rear-wheel electric braking are major disadvantages of this parallel arrangement. Overall, the electronic control of this rear-wheel-drive hybrid electric vehicle is one of the most complex and expensive automotive electronic controls known in the art. The high cost of the large and powerful propulsion components and complicated electronics make the application of this front-engine rear-wheel-drive parallel hybrid system possible only in luxury passenger cars where the cost concern is of lesser significance (See "Lexus Hybridized Sport Sedan" *Automotive Engineering*, October 2006, pp 74-80).

All of the parallel hybrid electric vehicles discussed above are with two-wheel drive systems. The two-wheel drive systems are relatively simple and efficient. The two-wheel-drive is, however, inferior to the four-wheel-drive, in terms of traction, acceleration, electric braking, and safety of the vehicle. In a two-wheel-drive hybrid electric vehicle the electric tractive and braking forces are limited only by the vehicle weight distributed upon the wheels of the drive axle. Particularly disadvantageous is the lower limit of the electric braking force.

Four-Wheel-Drive Hybrid Electric Vehicles

Hybrid electric vehicles with four-wheel-drive system are known. In some of these vehicles the internal-combustion engine drives the wheels of one of the drive axles via a conventional drive train that includes a torque converter and an automatic gear-shift transmission, and the electric traction motor drives the wheels of the other drive axle via a conventional electric drive train. Such an arrangement with two independent power trains is expensive, and the improvement of the fuel efficiency and performance is barely significant enough to justify the higher cost of the four-wheel-drive hybrid electric vehicle of this type.

Some luxury sport-utility vehicles (Toyota Highlander Hybrid and Lexus RX 400h) employ an internal-combustion engine working in parallel with a front electric traction motor for driving the wheels of the front drive axle, and a rear electric traction motor for driving the wheels of the rear drive axle. Here, the front power train is arranged and operates as in the discussed above two-wheel-drive hybrid electric vehicles incorporating a planetary-gear-type mechanical-energy-mixing device (THS). The rear power train is a conventional electric power train. Both electric traction motors are also arranged to selectively operate as electric braking generators. At normal load (cruising), the engine drives the front wheels of the vehicle and charges the battery while the rear traction motor is not operating. At heavy load (acceleration), the engine and front traction motor drive the front wheels while the rear traction motor, powered by the battery, drives the wheels of the rear drive axle. Then, the three mechanical power sources—engine, front motor, and rear motor—together drive the vehicle in a four-wheel-drive mode. This drive system operates in four-wheel-drive mode only under high-tractive-force driving conditions. During vehicle speed retardation or braking both traction motors operate as electric braking generators and recover electric energy into the battery. These four-wheel-drive hybrid electric vehicles incorporate very powerful electric traction motors. The total electric power and torque outputs are larger that the power and torque output of the internal-combustion engine. The performance of these vehicles is very good at normal road conditions, and the fuel efficiency is higher than that of the conventional version of the same vehicles using larger engines and providing similar performance specifications. Nevertheless, these four-wheel-drive hybrids have several major shortcomings. First, they cannot utilize the four-wheel-drive mode at adverse road conditions, when the tractive force limit is very low due to the low coefficient of friction between the tires and road surface (rain, snow, ice). In other words, the four-wheel-drive mode is not available exactly when it is most beneficial. Second, the control of the tractive force by the accelerator pedal and the control of the electric braking force by the brake pedal depend on the rotational behavior of the engine, electric generator, front motor, and rear motor, and therefore are very complicated. And finally, the two power trains and the complicated control of driving and braking results in a very high cost. Such high cost may be accepted only for automobiles in the luxury class segment, where high performance specifications are the main objective and the price is of lesser importance.

Some examples of four-wheel-drive hybrid electric vehicles are disclosed in U.S. Pat. Nos. 5,301,764 Gardner; 5,346,031 Gardner; 5,495,906 Furutani, and 6,638,195 Williams.

It is possible a four-wheel-drive hybrid electric vehicle to be developed by modifying the drive train of some of the two-wheel-drive vehicles described above. In such a modification, the mechanical energy from the output shaft of the transmission may be transmitted through a gear transfer box to an inter-axle differential and, split within that differential, to be further transmitted to the input shafts of a front and a rear drive axles through respective drive shafts. In fact, most of the four-wheel-drive systems of the conventional vehicles use similar arrangement for transmitting mechanical energy from the output shaft of the transmission to the four wheels of the vehicle. Such an arrangement, however, has not found practical application, because the addition of a gear transfer box and a center speed differential will further complicate the drive train, reduce the efficiency, and increase the cost of an already quite complicated and expensive hybrid electric vehicle.

The electric traction motors of all hybrid electric vehicles of the prior art, described herein above, are conventional electric traction motors having a stator and a rotor. When a conventional electric traction motor is energized, the rotor is propelled to rotate under the action of the electromagnetic forces between the stator and rotor.

Operational Control of the Parallel Hybrid Electric Vehicles

In all of the parallel hybrid electric vehicles described above, a central electronic controller usually continuously monitors, via appropriate sensors, the position of the vehicle directional control switch, depression of the accelerator pedal, depression of the brake pedal, speed and acceleration of the vehicle, and other variables depending on the specific design and method of driving and braking of the vehicle. The central electronic controller processes the signals from the sensors and, in accordance with a predetermined program recorded within its memory ultimately controls via respective controllers the operation of the internal-combustion engine, electric traction motor, electric generator, mechanical power transmission, and other devices included in the power train of the vehicle. The central electronic controller coordinates the operation of the different components of the drive and braking systems in response to the control commands of the operator of the vehicle and in dependence on the variable parameters related to the operation of the respective components. It is quite obvious that the larger the number of the variable parameters the more complicated, expensive, and sluggish is the electronic control of the vehicle driving and braking. Other terms, such as "electronic module", "microprocessor", "vehicle computer", etc. are used in the art to indicate a central electronic controller such as the one described herein above.

Series Arrangement vs. Parallel Arrangement

Most of the mass produced passenger cars, sport-utility vehicles, light trucks, and buses operate in combined, city and highway, duty cycles. Within a city limits, and during the traffic jams on the highways, which unfortunately are so frequent around the large cities and within the densely populated areas, the automobiles usually operate with relatively low speeds at frequent stop-and-go conditions. As previously discussed, hybrid automobiles with series arrangement of the power train are most appropriate for such driving conditions, as far as fuel efficiency and exhaust emissions are concerned. On the other hand, the parallel hybrid electric vehicles are more appropriate for operating at relatively high speeds, as far as fuel efficiency and performance are concerned. As previously noted, in the parallel arrangement the internal-combustion engine alone may drive the vehicle at normal-load conditions (cruising), and both the internal-combustion engine and traction motor together may drive the vehicle at heavy-load conditions (accelerating). Thus, the propulsion capabilities of the engine and traction motor may be selectively used and combined for achieving high fuel-efficiency and performance at highway operational conditions.

The major disadvantages of the series arrangements (as discussed earlier) are their relatively large electric power plant, including the electric traction motor, capable to drive the vehicle within the entire vehicle speed range, and the relatively low total fuel efficiency due to the several conversions of the energy generated by the internal-combustion engine. The major disadvantages of the parallel arrangements (as discussed earlier) are their relatively complicate, inefficient, and expensive mechanical power transmissions, and the complicated and expensive control of the continuously variable tractive and braking forces of the vehicle, which control is more or less not direct, instant, and linear.

The total fuel efficiency of a hybrid electric vehicle depends not only on the efficiency of the operation of the sources of mechanical energy but also on the efficiency of the transmission of that energy to the driving wheels of the vehicle. In this regard, the known four-wheel-drive parallel hybrid electric systems, which provide the best performance characteristics, are even more complicated and less efficient than the known two-wheel-drive systems, as discussed herein earlier.

The fuel efficiency and performance of the hybrid electric vehicle depend very much on the accuracy and speed of the electronic control upon the generation and flow of mechanical and electrical energy within the power train of the vehicle. Exact, correct, and instant electronic control is essential for achieving high performance characteristics. If the power train of the vehicle is very complicated, the central electronic controller has to monitor a large number of variable parameters, to process a large number of input signals, and to control a large number of electric control circuits, according to a very complicated program. All that makes the electronic control complicated, expensive, less exact, and slower.

Therefore, it will be very beneficial if in a hybrid electric vehicle, which operates in combined city and highway conditions, the advantages of the series arrangement could be combined with the advantages of the parallel arrangement, and the disadvantages of both arrangements could be significantly reduced or eliminated. Also, it will be very beneficial if in a four-wheel-drive hybrid electric vehicle the mechanical energy could be delivered to the wheels of the vehicle via very simple and efficient drive trains, including no torque-converter, no automatic gear-shift transmission, no continuously-variable speed transmission, no planetary-gear-type mechanical-energy-mixing mechanism, no transfer gear box, no inter-axle differential, or other heavy, inefficient, and expensive components. It will be very beneficial if the mechanics of the power train is simple, and if the electronics has to monitor a small number of variables and to control only one or two simple electric control circuits for providing direct, instant, and linear control of the tarctive and braking forces of the vehicle in response to the depression of the accelerator pedal or brake pedal respectively.

SUMMARY

This invention provides a hybrid electric vehicle including an exceptionally simple and efficient combined series/parallel four-wheel-drive system capable of driving the vehicle:
- forward via an electric traction motor from standstill to a certain predetermined medium speed of the vehicle in a low-speed/four-wheel-drive mode;
- forward via an internal-combustion engine above the predetermined medium speed under normal load in a high-speed/two-wheel-drive mode;
- forward via both the internal combustion engine and the electric traction motor above the predetermined medium speed under heavy load in a high-speed/four-wheel-drive mode, and
- backward via the electric traction motor in a reverse/four-wheel-drive mode.

The vehicle according to this invention operates as a series four-wheel-drive hybrid electric vehicle when moving with relatively low speeds (lower than the predetermined medium speed), and as a parallel four-wheel-drive hybrid electric vehicle when moving with relatively high speeds (higher than the predetermined medium speed). Thus, the invention combines the advantages of the series arrangement (which are substantial when the vehicle operates in cities or other densely populated areas and moves with relatively low speeds at frequent stop-and-go operational conditions) with the advantages of the parallel arrangement (which are substantial when the vehicle move with relatively high-speeds at highway operational conditions, where the power demand may be very high) in terms of fuel-efficiency, exhaust emissions, and performance. This is one of the major advantages of this invention over the prior art.

The hybrid electric vehicle according to this invention comprises:
- a first drive axle including two driving wheels and a second drive axle including two driving wheels, wherein the wheels of at least one of the two drive axles are also steerable for steering the vehicle;
- a dual-rotor electric traction motor for selectively driving simultaneously the four driving wheels of the vehicle, the dual-rotor motor including a first rotor and a second rotor, wherein when the dual-rotor motor is energized the two rotors are propelled to rotate in opposite direction under the action of the same electromagnetic forces, and wherein the opposite direction of rotation of the two rotors are reversible;
- a first drive train for transmitting mechanical energy between the first rotor and the wheels of the first drive axle;
- a second drive train for transmitting mechanical energy between the second rotor and the wheels of the second drive axle;
- an electric power source for supplying the dual-rotor motor with electric energy, the electric power source including an electric battery for storing electric energy and selectively powering the dual-rotor motor and an electric generator for powering the dual-rotor motor and selectively charging the electric battery;
- an internal-combustion engine for selectively driving the electric generator or the electric generator and the wheels of the first drive axle;
- a third drive train for transmitting mechanical energy between the internal-combustion engine and the wheels of the first drive axle;
- a clutch included in the third drive train for selectively interrupting the transmission of mechanical energy between the internal-combustion engine and the wheels of the first drive axle; and
- a central electronic controller arranged and programmed to control and coordinate the operation of the clutch, dual-rotor motor, and internal-combustion engine for operating the vehicle in several different drive modes including:
  (i) a forward/low-speed/four-wheel-drive mode, wherein at speeds of the vehicle lower than a predetermined speed the clutch is disengaged, the dual-rotor motor alone drives the vehicle, and the internal-combustion engine drives the electric generator or rests;
  (ii) a forward/high-speed/two-wheel-drive mode, wherein under normal load at speeds of the vehicle higher than the predetermined speed the clutch is engaged, the internal-combustion engine alone drives the vehicle while also driving the electric generator, and the dual-rotor motor dose not operate;
  (iii) a forward/high-speed/four-wheel-drive mode, wherein under heavy load at speeds of the vehicle higher than the predetermined speed the clutch is engaged and both the internal-combustion engine and the dual-rotor motor together drive the vehicle, and
  (iv) a reverse/four-wheel-drive mode, wherein the clutch is disengaged, the opposite directions of rotation of said rotors are reversed, the dual-rotor motor alone drives the vehicle backward, and the internal-combustion engine drives the electric generator or rests.

The drive system of the vehicle according to this invention includes an internal-combustion engine and only one electric traction motor, and yet the system is capable of driving the vehicle in four-wheel-drive modes within the entire speed range of the vehicle. This is a major advantage of the present invention over the prior art, and particularly over the four-wheel-drive hybrid electric vehicles employing an engine and at least two electric traction motors. Furthermore, the power train of the vehicle according to this invention dose not include any torque converter, automatic gear-shift transmission, continuously-variable speed transmission, transfer gear-box, inter-axle differential, or other complicated, heavy, noisy, energy-consuming, and expensive components, which are typically used in the four-wheel-drive systems. The simplicity of the mechanics of this drive system is remarkable. This simplicity results in high mechanical efficiency, and consequently—in high fuel efficiency, which is another major advantage of this invention over the prior art. In addition, the simplicity of the mechanics allows for a relatively simple electronic control of the operation of the vehicle, and ultimately equates to a relatively low cost of the hybrid electric vehicle according to this invention.

As indicated above, in the vehicle according to this invention, the electric traction motor is a dual-rotor motor. Also known in the art as double-rotor motor or stator-less motor, the dual-rotor motor has two rotors and no stator. In a dual-rotor motor, both rotors are mounted coaxially in a motor housing. Usually a smaller inner rotor is mounted inside a larger outer rotor. Typically, the shaft of one of the rotors extends from one of the side flanges of the motor in one direction and the shaft of the other rotor extends from the other of the side flanges of the motor in the opposite direction.

One of the rotors is arrange as a motor field and the other rotor is arranged as a motor armature. When the dual-rotor motor is energized, the two rotors are propelled to rotate in opposite directions under the action of the electromagnetic forces between them. The dual-rotor motor may be a direct-current or an alternating-current electrical machine of different type and design.

Most contemporary conventional electric traction motors are three-phase synchronous machines with permanent magnets embedded in their rotors and armature windings on their stators. A dual-rotor electric traction motor may be arranged in a similar way, i.e., the inner rotor may be arranged as a motor field with embedded permanent magnets and the outer rotor may be arranged with the armature windings. In such a dual-rotor motor, the electric current may be conducted from terminals on the stationary motor housing to the windings of the outer rotor through contacts of brushes (which are attached to the motor housing) and rings (which are mounted on the outer rotor).

A remarkable feature of the dual-rotor motor is that the torques on the shafts of both rotors are always equal (because the rotors are propelled to rotate in opposite directions by the same electromagnetic forces), but the rotors may rotate with different absolute speeds, referring to a static body—such as the motor housing—depending on the external mechanical load upon each rotor.

Another remarkable feature of the dual-rotor motor is that, if it is incorporated in a drive system, the total available torque on the shafts of both rotors, i.e., the sum of the torques of both rotors, is two times larger than the torque available on the shaft of an otherwise equivalent in size and power conventional motor of the same kind, operating under the same electrical parameters. If the two rotors rotate in opposite directions with equal speeds, those speeds will be two times lower than the rotational speed of the rotor of the equivalent conventional motor operating under the same electrical parameters.

And another important feature of the dual-rotor motor is that, in principle, the smaller inner rotor can rotate safely with much higher rotational speed than the safe rotational speed of the larger outer rotor.

The control and protection of a dual-rotor electric traction motor, including directional control, torque-speed output control, selective operation as an electric braking generator, over-speed protection of the rotors, thermal protection of the motor, etc., are arranged generally in the same manner and by the same means as in a conventional traction motor of the same electrical type. In this regard, a dual-rotor motor is not more complicated than an equivalent conventional motor of the same electrical type. A dual-rotor motor may have a very effective cooling system, because it allows an efficient continuous internal air circulation in addition to the typically employed external liquid cooling of the motor enclosure.

Before this invention, the unique features and advantages of the dual-rotor electric traction motors have not been fully explored and utilized within the propulsion system of a four-wheel-drive parallel hybrid electric vehicle or within the propulsion system of a four-wheel-drive combined series/parallel hybrid electric vehicle. An example of a four-wheel drive system for electric vehicles that employs a dual-rotor electric traction motor is disclosed in U.S. Pat. No. 6,005,358 Radev.

This invention provides a hybrid electric vehicle with a very simple and efficient control capable of coordinating the operation of the clutch, electric generator, internal-combustion engine, and dual-rotor motor, and the charging of the electric battery, for providing high total fuel efficiency and high performance characteristics of the vehicle under all driving conditions. The control of the operation of the vehicle is such that the internal-combustion engine never idles and never operates with rotational speeds lower than a predetermined rotational speed within its optimum fuel-efficiency speed range, therefore providing high engine fuel efficiency.

The control of the vehicle according to this invention provides a very smooth automatic shifting from said forward/low-speed/four-wheel-drive mode to one of said two forward/high-speed drive modes or vice versa, depending only on the speed of the vehicle, as well as a very smooth automatic shifting from said forward/high-speed/two-wheel-drive mode to said forward/high-speed/four-wheel-drive mode and vice versa, depending only on the load of the vehicle.

Therefore, in some embodiments of this invention, the electric generator is further arranged to selectively operate as an electric motor powered by the electric battery, and the vehicle further comprises:

an electrically controllable clutch actuator for engaging or disengaging the clutch;

an electrically controllable generator controller for automatically controlling the operation of the electric generator, and further arrange to selectively operate the electric generator as an electric motor;

an electrically controllable internal-combustion engine controller for operating the internal-combustion engine;

an electrically controllable dual-rotor motor controller for operating the dual-rotor motor;

an electrically controllable electric battery charger for selectively connecting or disconnecting electrically the electric generator controller, electric battery, and dual-rotor motor controller to or from each other respectively;

a directional mode control switch controllable by the operator of the vehicle for pre-selecting the directional mode of the vehicle; and an accelerator pedal controllable by the operator of the vehicle for providing continuously variable control of the tractive force of the vehicle.

Also, in some embodiments of the present invention, the central electronic controller is arranged to continuously monitor the direction of motion, speed, and acceleration of the vehicle, the depression of the accelerator pedal, the rotational output speed of the internal-combustion engine, the state of charge of the electric battery, and the magnitude of the electric current drawn from the electric battery, and to control the clutch actuator, electric generator controller, dual-rotor motor controller, internal-combustion engine controller, and electric battery charger for operating the respective components and controlling the charging of the electric battery, wherein the central electronic controller is programmed:

(a) to disengage the clutch, and to keep the clutch disengaged when the vehicle is not moving, when the vehicle is moving forward with speeds lower than a first predetermined speed, and when the vehicle is moving backward;

(b) to start the internal-combustion engine, if the internal-combustion engine is not already running, and to operate the internal-combustion engine at a predetermined substantially constant rotational speed when the vehicle is not moving, when the vehicle is moving forward with speeds lower than the first predetermined speed, and when the vehicle is moving backward, only if any of the following conditions is detected: (i) the charge of the electric battery is lower than a predetermined low level, (ii) the electric current drawn from the electric battery is stronger than a predetermined electric current, and (iii)

the speed of the vehicle is between the first predetermined speed and a slightly lower second predetermined speed;

(c) to stop the operation of the internal-combustion engine, if the internal-combustion engine is already running, when the vehicle is not moving and the charge of the electric battery is higher than the predetermined low level;

(d) to stop the operation of the internal-combustion engine, if the internal-combustion engine is already running, when the vehicle is moving forward at speeds lower than the second predetermined speed and when the vehicle is moving backward, if the charge of the electric battery is higher than a predetermined high level and the electric current drawn from the electric battery is weaker than the predetermined electric current;

(e) to operate the internal-combustion engine at continuously variable torque-speed output in response to the depression of the accelerator pedal when the vehicle is moving forward at speeds higher than the first predetermined speed;

(f) to operate the dual-rotor motor at continuously variable torque-speed output in response to the depression of the accelerator pedal when the vehicle is moving forward at speeds lower than the first predetermined speed and when he vehicle is moving backward;

(g) to disconnect the dual-rotor motor from the electric power source regardless of the depression of the accelerator pedal when the vehicle is moving forward at speeds higher than the first predetermined speed and the internal-combustion engine alone is capable of sustaining the vehicle speed or of accelerating the vehicle to a higher speed in response to the depression of the accelerator pedal;

(h) to disconnect the electric generator from the electric battery and from the dual-rotor motor, to connect the dual-rotor motor to the electric battery, and to operate the dual-rotor motor at continuously variable torque-speed output in response to the depression of the accelerator pedal when the vehicle is moving forward at speeds higher than the first predetermined speed the internal-combustion engine alone is not capable of sustaining the vehicle speed or of accelerating the vehicle to a higher speed in response to the depression of the accelerator pedal, and the charge of the electric battery is higher than the predetermined low level; and (i) to disconnect the electric battery from the electric generator when the internal-combustion engine operates and the charge of the electric battery is higher than the predetermined high level.

This invention provides a hybrid electric vehicle with instant, direct, and linear control of the tractive force under all driving conditions, within the entire speed range of the vehicle. The continuously variable torque-speed output of the dual-rotor motor (when the dual-rotor motor alone drive the vehicle in said forward/low-speed/four-wheel-drive mode or in said reverse/four-wheel-drive mode), the continuously variable torque-speed output of the internal-combustion engine (when the internal-combustion engine alone drive the vehicle in said forward/high-speed/two-wheel-drive mode), and the continuously variable torque-speed output of both internal-combustion engine and dual-rotor motor (when these two sources of mechanical energy together drive the vehicle in said forward/high-speed/four-wheel-drive mode) are controlled only by the depression of the accelerator pedal. The central electronic controller does not have to monitor a large number of variables, to perform a large number of complicated computations, and to transmit a large number of output control signals to various components of the power train for regulating the tractive force of the vehicle. This direct, instant, and linear control of the tractive force is another of the major advantages of the present invention over the prior art, and particularly over the hybrid electric vehicles employing planetary-gear-type mechanical-energy-mixing devices.

This invention further provides a hybrid electric vehicle with a remarkably safe braking system. The braking system is capable of selectively converting part of the kinetic energy of the vehicle and part of the kinetic energy of the first and second drive trains into electric energy for charging the electric battery during speed retardation or braking of the vehicle. This invention provides four-wheel electric braking with recovery of electric energy, which is superior to the electric braking of all two-wheel-drive hybrid electric vehicles of the prior art, as far as the limitation of the braking force and the safety of the vehicle are concerned.

Therefore, in some embodiments of this invention, the dual-rotor motor is further arranged to selectively operate as an electric braking generator driven by the kinetic energy of the vehicle and the kinetic energy of the first and second drive trains, and the dual-rotor motor controller is further arranged to selectively operate the dual-rotor motor as an electric braking generator for converting part of said kinetic energy into electric energy charging the electric battery during speed retardation or braking of the vehicle. The operation of the dual-rotor motor as an electric braking generator is electrically controllable.

The operation of the dual-rotor motor as an electric braking generator is coordinated with the operation of conventional wheel brakes for providing maximum regeneration of electric energy with high braking performance and safety under all driving conditions. Therefore, some embodiments of a vehicle according to this invention further comprise: wheel brakes for braking the wheels of the drive axles; an electrically controllable wheel brakes actuator for selectively applying the wheel brakes; a brake pedal controllable by the operator of the vehicle for providing continuously variable control of the braking force of the vehicle, and a steering wheel controllable by the operator of the vehicle for varying the steering angle of the steerable wheels of the vehicle.

This invention provides a hybrid electric vehicle with safe, direct, instant, and linear control of the braking force. Therefore, in some embodiments of this invention, the central electronic controller is further arranged to continuously monitor the depression of the brake pedal, the steering angle of the steering wheel, the rotational speeds of the wheels of the drive axles, and the rotational speeds at the inputs of the two drive axles. The central electronic controller is further arranged to control the operation of the wheel brakes via the wheel brakes actuator and the operation of said dual-rotor motor as an electric braking generator, wherein the central electronic controller is further programmed to do the following:

(a) When the vehicle is moving forward with a speed lower than the first predetermined speed, the accelerator pedal is not depressed, and an acceleration of the vehicle is detected:
  to operate the dual rotor motor as an electric braking generator for maintaining the speed of the vehicle substantially-constant and charging the electric battery;

(b) When the vehicle is moving forward with a speed higher than the first predetermined speed, the accelerator pedal is not depressed, and an acceleration of the vehicle is detected:
  to disengage the clutch;

to operate the internal-combustion engine at the substantially constant rotational speed within its optimum fuel efficiency speed range, and to operate the dual rotor motor as an electric braking generator for maintaining the speed of the vehicle substantially constant and charging the electric battery;

(c) When the vehicle is moving forward with a speed lower than the first predetermined speed and the brake pedal is depressed:

to operate the dual-rotor motor as an electric braking generator when in response to the depression of the brake pedal the dual-rotor motor alone, while charging the electric battery, provides a continuously variable braking force capable of sustaining the vehicle speed during speed retardation or of decelerating the vehicle to a lower desirable speed during braking;

to operate the dual-rotor motor as an electric braking generator and, when in response to the depression of the brake pedal the dual-rotor motor alone does not provide a continuously variable braking force capable of sustaining the vehicle speed during speed retardation or of decelerating the vehicle to a lower desirable speed during braking, to gradually apply the wheel brakes increasing in a predetermined very short period of time their braking force from zero to a braking force corresponding to the depression of the brake pedal, and then to control the continuously variable braking force of the wheel brakes in response to the depression of the brake pedal;

to discontinue the operation of the dual-rotor motor as an electric braking generator regardless of the depression of the brake pedal and to brake the vehicle via the wheel brakes in response to the depression of the brake pedal when a difference between the rotational speeds of the wheels of any one of the two drive axles larger than a respective predetermined difference is detected, or when a difference between the rotational speeds at the inputs of the two drive axles larger than a predetermined difference is detected, wherein said predetermined speed differences vary with the variation of the steering angle of the vehicle steering wheel, and to brake the vehicle via the wheel brakes in response to the depression of the brake pedal when the electric battery is fully charged;

(d) When the vehicle is moving forward with a speed higher than the first predetermined speed and the brake pedal is depressed:

to disengage the clutch;

to operate the internal-combustion engine at the predetermined substantially constant rotational speed within its optimum fuel efficiency speed range;

to operate the dual-rotor motor as an electric braking generator when in response to the depression of the brake pedal the dual-rotor motor alone provides a continuously variable braking force capable of sustaining the vehicle speed during speed retardation or of decelerating the vehicle to a lower desirable speed during braking, while charging the electric battery;

to operate the dual-rotor motor as an electric braking generator and, when in response to the depression of the brake pedal the dual-rotor motor alone does not provide a continuously variable braking force capable of sustaining the vehicle speed during speed retardation or of decelerating the vehicle to a lower desirable speed during braking, to gradually apply the wheel brakes increasing in a predetermined very short period of time their braking force from zero to a braking force corresponding to the depression of the brake pedal, and then to control the continuously variable braking force of the wheel brakes in response to the depression of the brake pedal;

to discontinue the operation of the dual-rotor motor as an electric braking generator regardless of the depression of the brake pedal and to brake the vehicle via the wheel brakes in response to the depression of the brake pedal when a difference between the rotational speeds of the wheels of any one of the two drive axles larger than a respective predetermined difference is detected, or when a difference between the rotational speeds at the inputs of the two drive axles larger than a predetermined difference is detected, wherein said predetermined speed differences vary with the variation of the steering angle of the vehicle steering wheel, and to brake the vehicle only via the wheel brakes in response to the depression of the brake pedal when the electric battery is fully charged; and (e) When the vehicle is not moving or is moving backward:

to apply the wheel brakes in response to the depression of the brake pedal.

The present invention provides a hybrid electric vehicle with four-wheel regenerative electric braking, which may be as safe as the braking with the conventional wheel brakes, as far as the distribution of the braking force between the wheels of the front and rear drive axles of the vehicle is concerned. Therefore, in some embodiments of this invention, the proportion between the rotational speed reduction ratios of said first and second mechanical drive trains is approximately equal to a required for safe braking of the vehicle proportion between the braking forces on the wheels of the first and second drive axles. The safe four-wheel regenerative electric braking of a hybrid electric vehicle is another of the major advantages of this invention over the prior art.

These and other advantages of this invention over the prior art will become apparent from the following description and the accompanying drawings.

DETAILED DESCRIPTION

Figure 1:
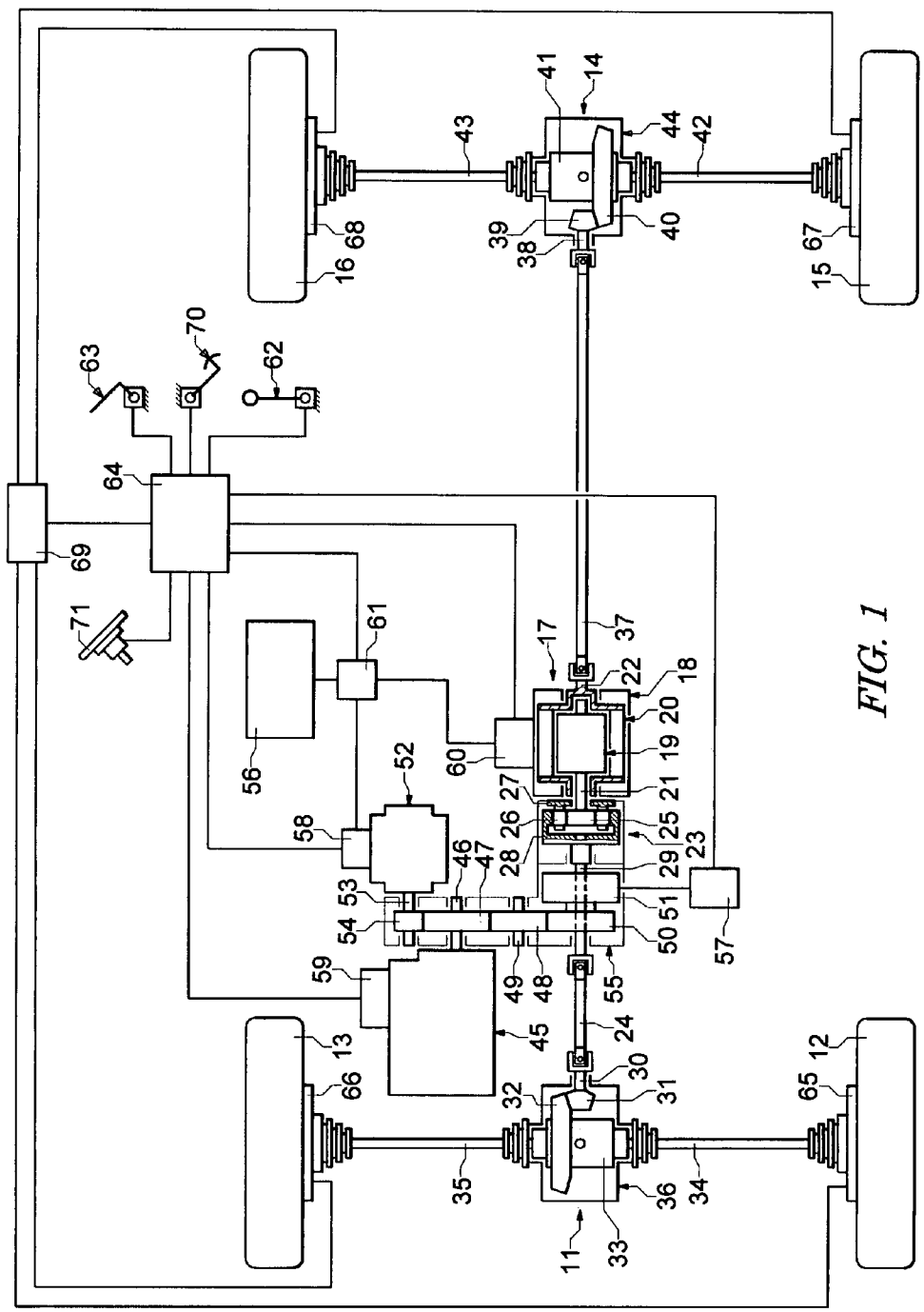
FIG. 1 is a schematic illustration of a first embodiment of a vehicle according to this invention.

In each of the nine figures, illustrating different embodiments of a vehicle according to the present invention, the same components are designated by the same numbers. Here, the term "same component" means that the component performs the same functions and is in the same relationships with the other components, which functions and relationships are relevant to this invention, as they are described initially hereinafter in this detailed description. For example, the internal-combustion engine, which appears in all nine figures, is described initially with FIG. 1 and is designated by number 45. In all other eight figures the internal-combustion engine is designated by the same number 45.

The mechanical components are shown very schematically as in views or cross sections unfolded into the plane of the drawing. The electrical components, controllers, and actuators are shown schematically as in a block diagram. The relationships between some of the components are shown with single lines regardless of how complicated these relationships might be in reality. For simplicity and clarity, no details irrelevant to the understanding of this invention are shown or described. For the same reason, some well known in the art components are mentioned but are not shown or are shown but are not described in detail. In the descriptions of the embodiments illustrated by each of the figures from FIG. 2 to FIG. 9 only the differences with the first embodiment of FIG. 1 are briefly described.

Referring now to FIG. 1, a first drive axle 11 having two driving wheels 12, 13 and a second drive axle 14 having two driving wheels 15, 16 are suspended to the frame of the vehicle in a suitable manner known in the art. In this invention the term "frame" is used to indicate the strong and rigid structural body of the vehicle that carries the loads and transfers them upon the wheels of the vehicle, to which body the static enclosures of the major components of the vehicle power train are normally firmly attached. The wheels of at least one of said two drive axles are also steerable for steering the vehicle. For simplicity of drawing and description, the frame of the vehicle, suspensions of axles and wheels, and arrangement of steering of the steerable wheels are not shown.

A dual-rotor electric traction motor 17, having a motor housing 18, a first rotor 19, and a second rotor 20, is located between the two drive axles in a longitudinal configuration. The dual-rotor motor 17 is shown in a very schematic cross section. In this embodiment of the invention, the first rotor 19 is a compact inner rotor, and the second rotor 20 is a hollow outer rotor. The outer rotor is rotatably supported inside the motor housing 18. The inner rotor is rotatably supported inside the outer rotor 20. Both rotors are coaxial. An output shaft 21 of the first rotor 19 extends towards the first drive axle 11, and an output shaft 22 of the second rotor 20 extends towards the second drive axle 14.

When the dual-rotor motor is energized, the two rotors are propelled to rotate in opposite directions under the action of the electromagnetic forces between the two rotors. The opposite directions of rotation of the two rotors are reversible. The described embodiment of the dual-rotor motor with an inner rotor and an outer rotor is only a preferable one. However, for a vehicle according to this invention, there is no requirement that one of the rotors must be an inner rotor and the other rotor must be an outer rotor. Other types of dual-rotor motors may be used. For example, the rotors of the dual-rotor motor may be two coaxial disc-shaped rotors facing each other. What is relevant for this invention is that the same electromagnetic forces (action and reaction) propel the two rotors to rotate in opposite directions. In fact, the dual-rotor motor, as defined here, is the only known machine which utilizes the internal action and reaction forces for generating useful mechanical energy. This unique way of generating mechanical energy is the greatest advantage of the dual-rotor motor. In this invention the term "dual-rotor motor" is used to indicate an electric traction motor as described herein above.

A first mechanical drive train connects the first rotor 19 with the wheels 12, 13 of the first drive axle for transmitting mechanical energy between the first rotor and the wheels of the first drive axle. In this embodiment, the first drive train includes a planetary-gear type speed reducer 23, a first cardan shaft 24, and a drive train of the first drive axle. Hereinafter, for abbreviation of this description, the shorter term "planetary gear reducer" is used instead of the term "planetary-gear type speed reducer". In this description the term "gear" is used to indicate a toothed gear.

A sun gear 25 of the planetary gear reducer 23 is coupled with the output shaft 21 of the first rotor, and is engaged with the planet gears 26 of the planetary gear reducer. A carrier 27 of the planet gears 26 is immobile. The planet gears are engaged with a ring gear 28 of the planetary gear reducer 23. The ring gear 28 is coupled with an output shaft 29 of the planetary gear reducer 23. The first cardan shaft 24 connects the output shaft 29 of the planetary gear reducer with an input shaft 30 of the first drive axle. The first cardan shaft 24 is actually an assembly of a shaft and two cardan joints.

A bevel pinion gear 31 integrated with the input shaft 30 of the first drive axle is engaged with a bevel crown gear 32 coupled with a differential 33 of the first drive axle. The differential may be a conventional differential or a limited-slip differential of a known appropriate type. Two wheel shafts 34, 35 connect two output gears of the differential 33 with the driving wheels 12, 13 of the first drive axle respectively. For simplicity of drawing and description the details of the differential, including said two output gears, are not shown. As it is well known in the art, the differential branches the drive train towards the two wheels of the drive axle, and allows the two wheels to rotate with different speeds depending on the external forces resisting the rotation of each wheel.

In this embodiment, the input shaft 30 integrated with the pinion gears 31 and the differential 33 coupled with the crown gear 32 are enclosed and rotatably supported within a first drive axle enclosure 36. In this embodiment, it is assumed that the axle enclosure 36 is firmly attached to the frame of the vehicle, while the wheels 12, 13 are independently suspended to the frame of the vehicle in some appropriate manner, and each of the wheel shafts 34, 35 is actually an assembly of shafts and constant-velocity joints allowing vertical motion of the respective wheel and steering motion if the wheel is also steerable, while transmitting mechanical energy to or from the wheel. Well known in the art are other appropriate arrangements of axle drive train and axle suspensions, which may be used in a vehicle according to this invention. For simplicity of drawing and description, no attachment of axle enclosure, suspension of wheels, and arrangement of wheel shafts are shown.

In the described herein above first mechanical drive train all components transmitting mechanical energy are constantly engaged to each other as described and always rotate in unison. The drive train provides a single speed reduction ratio.

A second mechanical drive train connects the second rotor 20 with the wheels 15, 16 of the second drive axle 14 for transmitting mechanical energy between the second rotor and the wheels of the second drive axle. In this embodiment, a second cardan shaft 37 connects the output shaft 22 of the second rotor 20 with an input shaft 38 of the second dive axle. Actually, the cardan shaft 37 is an assembly of a shaft and two cardan joints.

A bevel pinion gear 39 integrated with the input shaft 38 of the second drive axle is engaged with a bevel crown gear 40 coupled with a differential 41 of the second drive axle. Two wheel shafts 42, 43 connect two output gears of the differential 41 with the driving wheels 15, 16 of the second drive axle respectively. The differential branches the drive train towards the wheels of the drive axle. For simplicity of drawing and description, the details of the second drive axle differential, including said output gears, are not shown.

In this embodiment, the input shaft 38 integrated with the pinion gear 39 and the differential 41 coupled with the crown gear 40 are enclosed and rotatably supported within a second drive axle enclosure 44. In this embodiment, it is assumed that the axle enclosure 44 is firmly attached to the frame of the vehicle, while the wheels 15, 16 are independently suspended to the frame in some appropriate manner, and each of the wheel shafts 42, 43 is actually an assembly of shafts and constant velocity joints, allowing vertical motion of the respective wheel and steering motion if the wheel is steerable, while transmitting mechanical energy to or from the wheel. Well known in the art are other appropriate arrangements of the axle drive train and axle suspension, which may be used in a vehicle according to this invention. For simplicity of drawing and description, no attachment of the axle enclosure, suspension of wheels, and arrangement of wheel shafts are shown.

In the described herein above second mechanical drive train all components transmitting mechanical energy are constantly engaged to each other as described and always rotate in unison. The drive train provides a single speed reduction ratio.

An internal-combustion engine 45 is a prime source of mechanical energy on board the vehicle. Hereinafter, for abbreviation of this description, the shorter term "engine" is frequently used instead of the term "internal-combustion engine". In this embodiment, the engine 45 is longitudinally situated in parallel with the dual-rotor motor 17. The engine is firmly attached to the frame of the vehicle in an appropriate manner. For simplicity of drawing and description, the frame and the attachment of the engine are not shown. An output shaft 46 of the internal-combustion engine extends in direction towards the second drive axle 14. In the hybrid electric vehicles, usually a damper-coupling connects the engine crankshaft to the engine output shaft for avoiding shocks during the start of the engine. For simplicity, however, no details of the engine but its main output shaft 46 are shown.

A third mechanical drive train connects the engine 45 with the wheels 12, 13 of the first drive axle 11 for transmitting mechanical energy between the engine and the wheels of the first drive axle. In this embodiment, a gear 47 coupled with the output shaft 46 of the engine is engaged with an intermediate gear 48 mounted onto an intermediate shaft 49. The intermediate gear 48 is also engaged with a clutch gear 50 mounted onto the output shaft 29 of the planetary gear reducer 23.

A clutch 51 is included in the third drive train for selectively interrupting the transmission of mechanical energy between the internal-combustion engine 45 and the wheels of the first drive axle 11. In this embodiment, the clutch is also mounted onto the output shaft 29 of the planetary gear reducer 23. The clutch is shown as in a block diagram and its specific type and design are not further discussed or clamed. In this embodiment, it is assumed that when the clutch 51 is engaged the clutch gear 50 is coupled with the output shaft 29 of the planetary gear reducer 23, and when the clutch 51 is disengaged the clutch gear 50 is not coupled with the output shaft 29 of the planetary-gear reducer and may rotate freely upon the output shaft of the planetary gear reducer.

Thus, when the clutch is engaged, mechanical energy is transmitted between the engine and the wheels of the first drive axle through the engine output shaft 46, gears 47, 48, clutch gear 50, clutch 51, output shaft 29 of the planetary gear reducer 23, first cardan shaft 24, and the drive train within the first drive axle. When the clutch is disengaged, the transmission of mechanical energy between the clutch gear and the output shaft of the planetary-gear reducer is interrupted, and, therefore, the transmission of mechanical energy between the internal-combustion engine and the wheels of the first drive axle is interrupted. It is clear that the third drive train described here includes a part of the first drive train described earlier.

In the described herein above third mechanical drive train, when the clutch is engaged all components transmitting mechanical energy are constantly engaged as described and always rotate in unison. The drive train provides a single-speed reduction ratio.

An electric generator 52 is a prime source of electric energy on board the vehicle. In this embodiment the electric generator 52 is longitudinally located in parallel with the engine. An input shaft 53 of the electric generator extends towards the engine. Hereinafter, for abbreviation of this description, the shorter term "generator" is frequently used instead of the term "electric generator".

A fourth mechanical drive train connects the engine 45 with the generator 52 for transmitting mechanical energy between the engine and the generator. In this embodiment, the fourth drive train is a single-stage gear-reducer including the gear 47 coupled with the output shaft 46 of the engine and engaged with a smaller gear 54 coupled with the input shaft 53 of the generator. Such an arrangement is needed when the efficient operational speed range of the electric generator is higher than the operational speed range of the internal-combustion engine. It is obvious that in this embodiment the engine output shaft 46 and gear 47 are parts of both first and fourth drive trains. This, however, is only one of many possible arrangement of the fourth drive train. In the fourth mechanical drive train, all components transmitting mechanical energy are constantly engaged and always rotate in unison. The drive train provides a single speed reduction ratio.

The shafts of the first, third, and fourth mechanical drive trains with the respective gears, including the ring gear 28 of the planetary gear reducer and the clutch, with the exception of the cardan shaft 24 and the drive train within the first drive axle, are enclosed and rotatably supported within a transmission enclosure 55 in an appropriate manner. Though the transmission enclosure may be composed of several parts firmly attached to each other, for simplicity and clarity of the drawing, it is schematically shown with a finer line as a single body in an unfolded cross-section. The carrier 27 of the planet gears 26 of the planetary gear reducer is firmly attached to the transmission enclosure.

Although gaps between the transmission enclosure 55 and the engine 45, dual-rotor motor 17, and generator 52 respectively are shown for clarity, it is assumed that the transmission enclosure is firmly attached to the engine, and the dual-rotor motor enclosure and the generator are firmly attached respectively to the transmission enclosure. In fact, not only the engine, but the entire block composed of the engine, transmission enclosure, dual-rotor motor, and generator may be appropriately attached firmly to the frame of the vehicle. For simplicity of drawing and description, the fastening of these components of the power train to each other and to the frame of the vehicle is not shown.

A high-voltage electric traction battery 56 stores electric energy on board the vehicle. When the engine operates, it drives the electric generator 52, and the generator selectively charges the electric traction battery when the battery is not sufficiently charged, and supplies the dual-rotor motor 17 with electric energy when the dual-rotor motor operates. The electric traction battery selectively powers the dual-rotor motor, and also may supply with electric energy other electric components and systems of the vehicle via appropriate electrical devices and circuits, which are not shown for simplicity of drawing and description. Both the generator and the electric traction battery are the source of electric energy on aboard the vehicle. Hereinafter, for abbreviation of this description, the shorter terms "electric battery" or "battery" are frequently used instead of the term "electric traction battery". In this invention the term "sufficiently charged", referring to the state of charge of the battery, indicates that the electric charge of the battery is between a predetermined high level and a predetermined low level. The high level of charge is lower than the state of the battery when it is fully charged, and the low level of charge is higher than the fully discharged state of the battery. However, the system is arranged to operate preferably when the battery is sufficiently charged, therefore, the charging of the battery with electric energy from the generator is initiated when the battery is at its low electric charge level and is terminated when the battery is at its high electric charge level, as it is herein later described.

A clutch actuator 57 engages or disengages the clutch 51. The specific arrangement of the clutch actuator depends on the specific type and design of the clutch. For example, if the clutch is a fluid-pressure operated frictional-discs clutch, then the clutch actuator shall include at least a source of fluid pressure and an electromagnetic fluid-pressure directional-control valve. In any case, however, the clutch actuator is electrically controllable. The clutch actuator is shown as in a block diagram, and the relationship between the clutch and clutch actuator is indicated by single line. The clutch actuator may be further arranged to automatically engage the clutch when the vehicle is parked and the electric control of the clutch actuator is terminated. Thus, the internal-combustion engine will provide a vehicle motion resisting force when the vehicle is parked.

An electric generator controller 58 is provided for automatically controlling the operation of the electric generator including the functions related to the proper and safe operation of the generator, charging of the battery, and supplying of the dual-rotor motor with electric energy, for example such functions being voltage regulation, over-voltage protection, protection from current flowing back from the electric battery when the generator does not operate, rectification of the electric current if the generator is an alternating-current machine, etc. However, because those automatically controlled functions depend on the specific kind and design of the generator, dual-rotor motor, and battery, they are not further discussed or claimed specifically. Hereinafter, for abbreviation, the term "generator controller" is frequently used instead of the term "electric generator controller".

In some embodiments, (as it is in this one) the generator 52 is further arranged to selectively operate as an electric motor, and the generator controller 58 is further arranged to selectively operate the generator as an electric motor powered by the battery for starting the internal-combustion engine, wherein the operation of the generator as an electric motor is electrically controllable.

An internal-combustion engine controller 59 operates the internal-combustion engine 45. The internal-combustion engine controller operates the engine devices, which in a conventional engine operating system are operable by the accelerator pedal of the vehicle. The internal-combustion engine controller 59 controls the continuously variable fuel intake and air intake of the internal combustion engine, and may control other functions which are directly related to the continuously variable torque-speed output of the internal-combustion engine, such as a variable valve timing, or a variable ignition timing, etc. The internal-combustion engine controller is also arranged to selectively stop the operation of the engine. The internal-combustion engine controller is electrically controllable. Hereinafter, for abbreviation of this description, the shorter term "engine controller" is frequently used instead of the term "internal-combustion engine controller".

A dual-rotor motor controller 60 operates the dual-rotor motor 17. The dual-rotor motor controller 60 is arranged to selectively render the dual-rotor motor operable in the opposite directions of rotation of the two rotors corresponding to a forward drive mode of the vehicle, or in the opposite directions of rotation of the two rotors corresponding to a backward drive mode of the vehicle, or to disconnect the dual-rotor motor from said electric power source and to render the dual-rotor motor inoperable in a neutral drive mode. The selection of either one of said three directional drive modes is electrically controllable. The dual-rotor motor controller is further arranged when the dual-rotor motor is operable to control the magnitude of the electric power input to the dual-rotor motor for providing continuously variable torque-speed output from the dual-rotor motor, wherein the control of the torque-speed output of the dual-rotor motor is electrically controllable.

For simplicity of drawing and description, the generator controller and the dual-rotor motor controller are shown as attached to the generator and to the dual-rotor motor respectively. However, the specific locations of these two components are irrelevant for the purpose of this invention.

An electric battery charger 61 electrically connects the generator controller 58, the electric battery 56, and the dual-rotor motor controller 60 to each other respectively through appropriate electrical power circuits. For simplicity of drawing and description, the electrical connections between the generator controller, dual-rotor motor controller, battery, and battery charger are represented by single lines. The electric battery charger is arranged to selectively disconnect the generator controller, electric battery, and dual-rotor motor controller from each other respectively, wherein said selective disconnections are electrically controllable.

It is clear for the skilled in the art that the generator controller may be arranged for selectively disconnecting the generator simultaneously from the battery and from the dual-rotor motor controller, and that the dual-rotor motor controller may be arranged for selectively disconnecting the dual-rotor motor simultaneously from the generator controller and from the battery. If the generator controller and the dual-rotor motor controller are so arranged, then the battery charger is arranged to selectively disconnect only the battery from the generator controller and from the dual-rotor motor controller respectively.

When the generator is disconnected from the battery and from the dual-rotor motor no electric current flows through the generator, although the internal-combustion engine may drive the generator. When the dual-rotor motor is disconnected from the battery and from the generator no electric current flows through the dual-rotor motor, although the vehicle may be moving and the two rotors may be rotating.

The battery charger 61 may be further arranged to charge the battery from an external source of electric energy when the vehicle is parked. Said external source of electric energy may be the common household electric grid, or another appropriate external electric power source. A cable with electric receptacle and plug connects the battery charger to the outlet of the external electric power source. For simplicity of drawing and description, these details are not shown or claimed.

The electrically controllable controllers and actuators, such as the described herein above, usually include electro-mechanical devices, such as linear or angular servo-motors, electromagnetic valves, electromagnets, etc., and electrical control circuits, capable of responding accordingly to electrical input signals. The controllers and actuators are shown symbolically as in a block diagram, and no their details are described or claimed.

A directional mode control switch 62, which is usually a lever-switch, is provided for pre-selection of the desired directional modes of the vehicle. The operator of the vehicle pre-selects a forward drive mode preparing the dual rotor motor for driving the vehicle forward, or a backward drive mode preparing the dual-rotor motor for driving the vehicle backward, or a neutral drive mode rendering the dual-rotor motor not operable, by placing the directional mode control switch 62 in a forward, or a backward, or a neutral drive position respectively. The positions of the directional mode control switch are self-locked for preventing unintentional changing of the directional drive mode.

An accelerator pedal 63 is provided for controlling the continuously variable tractive force of the vehicle. The operator of the vehicle controls the continuously variable tractive force by varying the depression of the accelerator pedal 63. The tractive force is substantially proportional to the depression. The accelerator pedal is arranged to resist the depression, usually via a spring, wherein the resisting force is proportional to the depression, for providing the operator of the vehicle with an appropriate control feeling. In this invention, the term "tractive force" refers to the sum of the tractive forces of the four driving wheels, unless the tractive force or forces of any specific driving wheel or wheels respectively are otherwise specified. It is clear for the skilled in the art that, instead of by a pedal, the tractive force may be controlled manually by an accelerator lever, as it is, for example, in vehicles for some physically disabled operators. In this invention, the term "accelerator pedal" refers to the device that the operator uses to control the tractive force, and no details of the accelerator pedal are described or claimed.

A central electronic controller 64 is arranged to continuously monitor, through several sensors, the speed and acceleration of the vehicle, the rotational output speed of the internal-combustion engine 45, the position of the directional mode control switch 62, the depression of the accelerator pedal 63, the state of charge of the electric battery 56, and the magnitude of the electric current drawn from the battery. The sensors are not shown for simplicity of drawing and description. The central electronic controller 64 is arranged to process the input signals from the sensors and to generate output signals for controlling the clutch actuator 57, generator controller 58, engine controller 59, dual-rotor motor controller 60, and battery charger 61 respectively, in accordance with a predetermined program. The central electronic controller is also arranged to control time-related functions which are described herein later.

Thus, ultimately, the central electronic controller 64 controls the operation of the clutch 51, generator 52, engine 45, dual-rotor motor 17, and the charging of the battery 56, in accordance with the monitored variable parameters and said predetermined program, which program is described in details herein later.

Whether the central electronic controller is a compact electronic device with integrated electronic circuits, or several electronic devices operating in unison and performing the described functions is irrelevant for the purpose of this invention. The physical locations of the components of the central electronic controller are also irrelevant for the purpose of this invention. The central electronic controller 64 is shown as in a block diagram. Single lines indicate the relationships of the central electronics controller with the clutch actuator 57, each of the controllers 58, 59, 60, battery charger 61, directional mode control switch 62, and accelerator pedal 63 respectively. For abbreviation of this description, the term "electronics" is frequently used hereinafter instead of the term "central electronic controller".

In this specification of the invention, the terms "speed of the vehicle" and "acceleration of the vehicle" indicate the magnitude of the speed of the vehicle and the magnitude of the tangential acceleration of the vehicle (i.e. the change of the magnitude of the speed of the vehicle), respectively.

In some embodiments, as in this one, the vehicle is further equipped with a safe braking system capable of converting part of the entire kinetic energy of the moving vehicle and part of the kinetic energy of the rotating parts of the first and second drive trains into electric energy, charging the battery during speed retardation or braking of the vehicle. In this embodiment, the braking system includes: wheel brakes 65, 66, 67, 68, for braking the rotation of the wheels of the two drive axles, which wheel brakes are usually required by law; an electrically controllable wheel brakes actuator 69 for operating said wheel brakes; a brake pedal 70 controllable by the operator of the vehicle for providing continuously variable control of the braking force of the vehicle, and part of the described above drive system of the vehicle, which is arranged to provide electric braking with recovery of energy.

In this specification the term "braking force" refers to the sum of the braking forces of the four driving wheels, unless the braking force or forces of any specific driving wheel or wheels respectively are otherwise specified. The operator of the vehicle controls the continuously variable braking force by varying the depression of the brake pedal. The braking force is substantially proportional to the depression of the brake pedal. The brake pedal is arranged to resist the depression, usually via a spring, wherein the resisting force is proportional to the depression, for providing the operator of the vehicle with an appropriate control feeling. It is obvious for the skilled in the art that, instead of by a pedal, the braking force may be controlled manually by a brake lever, as it is, for example, in vehicles for some physically disabled operators. In this specification, the term "brake pedal" refers to the device that the operator uses to control the braking force.

In this embodiment, a steering wheel 71 controllable by the operator of the vehicle is provided for varying the steering angle of said steerable wheels of at least one of the drive axles. For simplicity, no other elements of the vehicle steering system are shown or described.

For the purpose of providing electric braking with recovery of energy, the dual-rotor motor 17 is further arranged to selectively operate as an electric braking generator driven by the kinetic energy of the vehicle and the kinetic energy of the rotating components of the first and second drive trains.

During speed retardation or braking of the vehicle, kinetic energy is transmitted from the wheels of the first drive axle through the first drive train to the first rotor and from the wheels of the second drive axle through the second drive train to the second rotor. The two rotors rotate in opposite directions and the dual-rotor motor operating as an electric braking generator brakes the vehicle while generating electric energy and charging the battery.

The dual-rotor motor controller is further arranged to selectively operate the dual-rotor motor as an electric braking generator. The operation of the dual-rotor motor as an electric braking generator is electrically controllable. The dual-rotor motor controller automatically performs the functions related to the proper and safe operation of the dual-rotor motor and charging of the battery. Because those automatically controlled functions depend on the specific kind and design of the dual-rotor motor and the battery, they are not further discussed or claimed. The dual-rotor motor controller is further arrange to control the magnitude of the electric power output from the dual-rotor motor for providing continuously variable control of the electric braking force.

The electronics 64 is further arranged to continuously monitor, through several sensors, the depression of said brake pedal 70, the steering angle of said steering wheel 71, the rotational speeds of the wheels 12, 13, 15, 16 of the drive axles, and the rotational speeds of the input shafts 30, 38 of the two drive axles. The electronics is arrange to control the operation of the dual-rotor motor as an electric braking generator, and to coordinate the operation of the dual-rotor motor with the operation of said wheel brakes actuator 69 in accordance with a predetermined program, which program is described in details herein later.

The relationships of the electronics 64 with the brake actuator 69, brake pedal 70, and steering wheel 71 are indicated respectively by single lines. The relationships between the brake actuator 69 and the wheel brakes 65, 66, 67, 68 are indicated respectively by single lines. The specific arrangement of the wheel brakes actuator depends on the specific type of the wheel brakes and the method of their operation. Usually the wheel brakes are fluid-pressure operated, and the wheel brakes actuator includes a source of fluid pressure and fluid-pressure-modulating valves. For simplicity of drawing and description, the wheel brakes and wheel brakes actuator are shown as in a block diagram, and no their details are described or specifically claimed.

The braking forces generated within the dual-rotor motor and transmitted to each of the driving wheels cannot be individually modulated. On the other hand, the braking force of each of the wheel brakes can be individually modulated via a brake actuator including an anti-lock braking system for preventing lockup of any one of the driving wheels of the vehicle. In any embodiment, however, wherein the dual-rotor motor is arranged to selectively operate as an electric braking generator, the electronics is programmed to coordinate the operation of the dual-rotor motor with the operation of the wheel brakes for safe braking of the vehicle, as herein later described.

In embodiments in which the wheel brakes actuator 69 includes an anti-lock braking system, an anti-slip traction control system also may be provided for automatically preventing excessive traction slip of any of the driving wheels of the vehicle. In such a case, the electronics is further arranged and programmed to coordinate the operation of the dual-rotor motor 17 and the operation of the engine 45 with the operation of said anti-slip traction control system for reducing the output of mechanical energy from the dual-rotor motor and the internal-combustion engine respectively when the anti-slip traction control system is actuated, until the traction is restored.

In fact, for safe operation of the vehicle, embodiments of a vehicle according to this invention that include an anti-slip traction control system and an anti-lock braking system are preferable. This is because when the dual-rotor motor drives the vehicle, an increase of the rotational speed and reduction of the tractive force of any one of the driving wheels, due to poorer adhesion of this wheel with the road surface (traction slip), will instantly reduce the tractive forces of all other driving wheels. And when the dual-rotor motor operates as an electric braking generator, a reduction of the rotational speed and decrease of the braking force of any one of the driving wheels, due to poorer adhesion of this wheel with the road surface (braking slip), will suddenly reduce the braking forces of all other driving wheels.

It is well known that a larger braking force of the front wheels of the vehicle is required for safe braking in a forward motion. A best arrangement would have to provide a variable proportion between the braking forces of the front and rear wheels depending on the variable deceleration of the vehicle. Such an arrangement, however, would be quite complicated. Usually, a preferable proportion between the braking forces of the front and rear wheels of the vehicle is selected by the vehicle designer, in accordance with the location of the center of gravity of the vehicle and the desired vehicle dynamics. The front and rear wheel brakes of the vehicle are accordingly designed for producing braking forces in the selected preferable proportion.

In some embodiments of a hybrid electric vehicle according to this invention, not only the proportion between the braking forces generated via the front and rear wheel brakes, but also the proportion between the braking forces generated by the dual-rotor motor and transmitted to the front and rear wheels may be the same preferable proportion that is required for safe braking. It is obvious that in such an arrangement the traction forces transmitted from the dual-rotor motor to the front and rear wheels respectively will also be in the same proportion.

In a vehicle according to this invention, the preferable proportion between the front and rear electric braking forces is easily established by selecting an appropriate proportion between the rotational speed reduction ratios of the first and the second drive trains, because the electric braking torques on the output shafts 21, 22 of the first and second rotors 19, 20 of the dual-rotor motor are always equal. If the rolling radiuses of all four wheels of the vehicle are the same, then the proportion between the electric tractive or electric braking forces transmitted from the dual-rotor motor to the wheels of the first and second drive axle respectively are the same as the proportion between the rotational speed reduction ratios of the first and second drive trains respectively.

In this embodiment, the first drive axle 11 is assumed to be the front axle of the vehicle. Here, the planetary gear reducer 23 is included in the first drive train for providing larger speed reduction ratio and, therefore, larger electric braking forces on the front wheels of the vehicle. For example, if the speed reduction ratios of the final drives of the first and second drive axles are the same and the rolling radiuses of all four wheels of the vehicle are the same, then the proportion between the front and rear electric braking forces will be equal to the speed reduction ratio of the planetary gear reducer 23. For example, if the speed reduction ratio of the planetary gear reducer is 2:1, then the proportion between the total reduction ratios of the first and the second drive trains will also be 2:1, the electric braking forces of the wheels 12, 13 of the first drive axle will be two times larger than the electric braking forces of the wheels 15, 16 of the second drive axle, and the speed of the first rotor will be two times higher than the speed of the second rotor. The higher speed of the first rotor is the reason why, in this embodiment, the first rotor 19 is the smaller inner rotor and the second rotor 20 is the larger outer rotor of the dual rotor motor 17.

The direction of rotation of the output shaft 29 of the planetary gear reducer 23 is opposite to the direction of rotation of the output shaft 21 of the first rotor, therefore the input shafts 30, 38 of the two drive axles rotate in the same direction, which allows both axles to have a standard (right) location of the respective crown gears 32, 40, as is shown in the drawing. Such an arrangement is beneficial for the manufacturing of the vehicle. The embodiment with the described herein planetary-gear reducer included in the first mechanical drive train, however, is only a preferable one. A number of other arrangements are also possible.

The electric energy for the electric control circuits of the components of the above described driving and braking systems of the vehicle is supplied from a low-voltage electric power source via an appropriate switch, controllable by the operator of the vehicle. The low-voltage electric power source, which may be a 12V or 24V electric battery, and said switch, which may be the key master switch of the vehicle, are not shown for simplicity of drawing and description. Usually, the central electronic controller is actuated and the vehicle becomes operable when the operator of the vehicle turns on the master switch. In the following description of the program of the central electronic controller and the operation of the vehicle, it is assumed that the central electronic controller is actuated and the vehicle is operable.

Hereinafter the program of the electronics 64 and the operation of the hybrid electric vehicle according to this embodiment is described:

(a) When the vehicle is not moving, which may be during the initiation of the operation of the vehicle or during a halt of the motion of the vehicle, the electronics detects no vehicle speed. The electronics is programmed to instantly disengage the clutch 51, but not to start the internal-combustion engine 45 unless it detects that the charge of the battery 56 is lower than a predetermined low level. The electronics is programmed, if it detects that the battery charge is lower than said predetermine low level, to start the engine by momentarily operating the electric generator 52 as an electric motor powered by the battery, and then to operate the engine at a predetermined substantially constant rotational speed within the optimum fuel-efficiency speed range of the engine. The electronics is programmed to operate the generator as an electric motor powered by the battery via the generator controller only as long as it is necessary for starting the engine, and to switch back the operation of the generator from operating as an electric motor to operating as an electric generator, immediately after the start of the engine. The electronic is programmed, after the start of the engine, to swiftly bring the engine to said predetermined substantially constant rotational speed within its optimum fuel efficiency speed range, and then to operate the engine at that substantially constant rotational speed. The electronics is programmed to stop the operation of the internal-combustion engine when a charge of the battery higher than said predetermined low level is detected. In this operational state, the engine rests or drives the generator and the generator charges the battery;

(b) When the operator of the vehicle places the directional mode control switch 62 in the forward drive position and depresses the accelerator pedal 63, the electronics, being so programmed, will continue to keep the clutch disengaged, will connect the dual-rotor motor 17 to the electric power source, and will operate the dual-rotor motor at continuously variable torque-speed output in response to the depression of the accelerator pedal. The mechanical energy transmitted from the first rotor 19 to the wheels 12, 13 of the first drive axle and the mechanical energy transmitted from the second rotor 20 to the wheels 15, 16 of the second drive axle drive the vehicle in a forward/low-speed/four-wheel-drive mode. The electronics is programmed, when the vehicle is moving forward, to keep the clutch disengaged and to drive the vehicle via the dual-rotor motor until a speed of the vehicle higher than a first predetermined speed is detected. When the speed of the vehicle is lower than said first predetermined speed, the electronics, being so programmed, will not start the internal-combustion engine, if the engine is not already running, unless it detects that the battery charge is lower than the predetermined low level, or the magnitude of the electric current drawn from the battery is bigger than a predetermined magnitude, or the speed of the vehicle is between the first predetermined speed and a slightly lower second predetermined speed. The electronics is programmed, however, when it detects any one of the above conditions, to start and operate the engine at said predetermined substantially constant rotational speed within its optimum fuel-efficiency speed range, by the same manner as described above in (a), regardless of the depression of the accelerator pedal. The electronics is programmed to monitor the magnitude of the electric current drawn from the battery and to start and operate the engine if that electric current is stronger than a predetermined electric current for preventing a very rapid discharge of the battery. The electronics is also programmed to stop the operation of the engine, if the engine is already running, when the battery charge is higher than the predetermined high level, the electric current drawn from the battery is weaker than said predetermined electric current, and the speed of the vehicle is lower than said second predetermined speed. When the engine is operating and a charge of the battery higher than the predetermined high level is detected, the electronics, being so programmed, will disconnect the battery from the generator controller, and thus will discontinue the charging of the battery by the generator above the predetermined high level, but the engine will continue to operate and the generator will continue to power the dual-rotor motor if the accelerator pedal is depressed. This operational state continues from standstill to the first predetermined speed of the vehicle. At this operational state the vehicle operates as a series hybrid electric vehicle. The dual-rotor motor alone drives the vehicle in a forward/low-speed/four-wheel-drive mode in response to the depression of the accelerator pedal, while the engine, operating at the predetermined substantially constant speed within its optimum fuel-efficiency speed range, drives the generator or rests. When the engine operates, the generator powers the dual-rotor motor, or charges the battery, or both. The electronics automatically varies at least the fuel and air intake of the engine, via the engine controller 59, for automatically running the engine at the predetermined substantially constant speed under a continuously variable electrical load upon the electric generator. When the engine does not operate the battery powers the dual-rotor motor. How long the battery will be able to power the dual-rotor-motor, while the engine rests, will depend mainly on the electric energy storage capacity of the battery, the state of charge of the battery before the start of the operation of the vehicle, and the load upon the dual-rotor motor. Therefore the power characteristics of the engine, dual-rotor motor, generator, and battery must be carefully selected during the design of the vehicle, depending on the specific kind and application of the vehicle and the required performance specifications. This is within the capability of those skilled in the art. In this description it is assumed that the battery may be charged above said high level, until the battery is fully charged by the dual-rotor motor, when the dual-rotor motor operates as an electric braking generator, as it is described herein later. The specific low and high electric charge levels, between which the electric traction battery is sufficiently charged, depend on the specific kind and design of the battery and the operational voltage limits of the entire electric power plant. However, when the engine operates at said substantially constant rotational speed within its optimum fuel-efficiency speed range, the engine power output, as well as the generator power output, is capable of powering the dual-rotor motor and keeping the battery sufficiently charged under all normal driving conditions;

(c) When the vehicle moves forward and a speed of the vehicle higher than the first predetermined speed is detected, the electronics, being so programmed, will engage the clutch 51 and will operate the engine at continuously variable torque-speed output in response to the depression of the accelerator pedal. The electronics is programmed to keep the battery connected to the generator controller if the battery charge is lower than the predetermined high level or to disconnect the battery from the generator controller if the battery charge is higher than the predetermined high level. The electronics is also programmed to disconnect the dual-rotor motor from the electric power source and to keep the dual-rotor motor disconnected from the electric power source, regardless of the depression of the accelerator pedal, when the internal-combustion engine alone is capable of sustaining the vehicle speed or of accelerating the vehicle to a higher speed in response to the depression of the accelerator pedal. Under these conditions, the internal-combustion engine drives the electric generator and the wheels of the first drive axle, while the two rotors of the dual-rotor motor rotate in opposite directions, but the dual-rotor motor is not energized and does not contribute to the propulsion of the vehicle. Therefore, the engine alone drives the vehicle in a forward/high-speed/two-wheel-drive mode. The electronics is also programmed, to involve the dual-rotor motor in the propulsion of the vehicle when the engine alone is not capable of sustaining the vehicle speed or of accelerating the vehicle to a higher speed in response to the depression of the accelerator pedal. For this purpose, the electronics is programmed, if the charge of the battery is higher than the predetermined low level, to disconnect the generator from the battery and from the dual-rotor motor controller, to connect the dual-rotor motor to the battery, to gradually increase in a predetermined short period of time the electric power input to the dual-rotor motor from zero to an electric power input corresponding to the depression of the accelerator pedal, and then to operate the dual-rotor motor at continuously variable torque-speed output in response to the depression of the accelerator pedal. The gradual increase of the electric power input to the dual-rotor motor is programmed for avoiding an abrupt increase in the combined tractive force of the engine and dual-rotor motor. Under these conditions, the engine drives the wheels of the first drive axle while the dual-rotor motor drives the wheels of both drive axles, therefore, both the engine and the dual-rotor motor driving the vehicle in a forward/high-speed/four-wheel-drive mode. The predetermined short period of time when the electronics automatically gradually increases the power input to the dual-rotor motor, before starting to operate the dual-rotor motor in response to the depression of the accelerator pedal, depends mainly on the desired performance characteristic of the vehicle and is therefore a choice of the vehicle designer. The electronics is programmed to instantly involve the dual-rotor motor in the driving of the vehicle as described above, when it detects that a predetermined very small increment of the depression of the accelerator pedal do not produce a substantially immediate predetermined acceleration (or reduction of deceleration) of the vehicle. When the desired vehicle speed is achieved and the operator of the vehicle decreases the depression of the accelerator pedal, the electronics, being so programmed, will disconnect the dual-rotor motor from the electric power source regardless of the depression of the accelerator pedal, will connect the generator to the battery and to the dual-rotor motor controller, and will continue to drive the vehicle only via the engine, as long as the engine alone is capable of sustaining the new vehicle speed or of accelerating the vehicle in response to the depression of the accelerator pedal. The described here forward/high-speed/four-wheel-drive mode may last only until the battery is sufficiently charged. The electronics is programmed to return the operation of the vehicle in the described above forward/high-speed/two-wheel-drive mode when an electric charge of the battery lower than the predetermined low level is detected. This operational state continues from the first predetermined speed to the maximum speed of the vehicle. At this operational state the vehicle operates as a parallel hybrid electric vehicle. If the vehicle decelerates while operating in one of the described above forward/high-speed drive modes, the electronics, being so programmed, will return the vehicle to operate in the described herein earlier in (b) forward/low-speed/four-wheel-drive mode when a speed of the vehicle lower than the first predetermined speed is detected. The capability of the engine alone to drive the vehicle in the described high-speed/two-wheel-drive mode depends on the power of the engine and the load under which the vehicle is operating. Therefore, the engine shall have adequate power for driving the vehicle under normal load and driving conditions in said forward/high-speed/two-wheel-drive mode. For example, the engine shall be able to maintain a high cruising speed on a substantially level road in normal weather conditions. In this invention, the term "load" is used to indicate the sum of all forces resisting the motion of the vehicle;

(d) When the operator of the vehicle places the directional mode control switch in the backward drive position and depresses the accelerator pedal, the electronics, being so programmed, will operate the dual-rotor motor at continuously variable torque-speed output in response to the depression of the accelerator pedal. Under these conditions, the dual-rotor motor drives the vehicle in a reverse/four-wheel-drive mode. The electronics is programmed to start the internal-combustion engine by momentarily operating the electric generator as an electric motor, if the engine is not already operating, and to operate the engine at the predetermined substantially constant rotational speed within its optimum fuel-efficiency speed range if before the start of the engine the charge of the electric battery is lower than the predetermined low level or the magnitude of the electric current drawn from the electric battery is bigger than the predetermined magnitude. The electronics is also programmed to stop the operation of the internal-combustion engine, if the engine is already running, the charge of the electric battery is higher than the predetermined high level, and the magnitude of the electric current drawn from the electric battery is smaller than the predetermined magnitude. The electronics is programmed to disconnect the electric battery from the electric generator controller when the internal-combustion engine operates and the charge of the electric battery is higher than the predetermined high level. This operational state continues as long as the vehicle moves backward. At this operational state the vehicle operates as a series hybrid electric vehicle;

(e) The electronics is programmed, when it detects that the forward speed of the vehicle is lower than the first predetermined speed, the accelerator pedal is not depressed, and the vehicle accelerates, to operate the dual rotor motor as an electric braking generator for maintaining the speed of the vehicle substantially constant, while charging the electric battery with electric energy generated by the dual-rotor motor. Thus the electronics automatically provides vehicle speed retardation with recovery of energy when the vehicle moves downhill and neither the accelerator pedal nor the brake pedal is depressed. This operational state continues until the vehicle start to decelerate or the operator depresses the accelerator pedal or brake pedal for changing the speed of the vehicle;

(f) The electronics is also programmed, when it detects that the forward speed of the vehicle is higher than the first predetermined speed, the accelerator pedal is not depressed, and the vehicle accelerates, to disengage the clutch, to operate the internal-combustion engine at the substantially constant speed within its optimum fuel-efficiency speed range, and to operate the dual rotor motor as an electric braking generator for maintaining the speed of the vehicle substantially constant, while charging the electric battery with electric energy generated by the dual-rotor motor. Thus the electronics automatically provides vehicle speed retardation with recovery of energy when the vehicle moves downhill and neither the accelerator pedal nor the brake pedal is depressed. This operational state continues until the vehicle start to decelerate or the operator depresses the accelerator pedal or brake pedal for changing the speed of the vehicle;

(g) The electronics is programmed, when it detects that the forward speed of the vehicle is lower than the first predetermined speed and the brake pedal 70 is depressed, to operate the dual-rotor motor as an electric braking generator for braking the vehicle and charging the battery. The electronics is programmed to brake the vehicle only via the dual-rotor motor when in response to the depression of the brake pedal the dual-rotor motor alone provides a continuously variable braking force capable of sustaining the vehicle speed during speed retardation or of decelerating the vehicle to a lower desirable speed during braking. The electronics is also programmed to involve the wheel brakes 65, 66, 67, 68 via the wheel brakes actuator 69 in the braking of the vehicle when it detects that the dual-rotor motor alone in response to the depression of the brake pedal does not provide a continuously variable braking force capable of sustaining the vehicle speed during speed retardation or of decelerating the vehicle to a lower desirable speed during braking, while charging the electric battery. For this purpose, and for avoiding an abrupt increase in the combined braking force of the dual-rotor motor and wheel brakes, the electronics is programmed to gradually apply the wheel brakes increasing in a predetermined very short period of time their braking force from zero to a braking force corresponding to the depression of the brake pedal, and then to control the continuously variable braking force of the wheel brakes in response to the depression of the brake pedal. The predetermined very short period of time when the electronics automatically gradually increases the braking force of the wheel brakes and the specific character of that gradual increase of the braking force depends on the specific arrangement of the wheel brakes actuator and the desired performance characteristic of the vehicle, and is therefore a choice of the vehicle designer. The electronics is programmed to instantly involve the wheel brakes in the braking of the vehicle as described above, if it detects that a predetermined very small increment of the depression of the brake pedal does not produce a substantially immediate predetermined deceleration of the vehicle. When the desired vehicle speed is achieved and the operator of the vehicle decreases the depression of the brake pedal, the electronics, being so programmed, will discontinue the braking action of the wheel brakes and will continue to brake the vehicle only via the dual-rotor motor, as long as the dual-rotor motor alone is capable of sustaining the new vehicle speed or of decelerating the vehicle to a lower desirable speed in response to the depression of the brake pedal;

(h) The electronics is programmed, when it detects that the forward speed of the vehicle is higher than the first predetermined speed and the brake pedal is depressed, to disengage the clutch, to operate the internal-combustion engine at the predetermined substantially constant rotational speed within its optimum fuel-efficiency speed range, and to operate the dual-rotor motor as an electric braking generator and the wheel brakes in the same manner as described above in (g), when the forward speed of the vehicle is lower than the first predetermined speed and the brake pedal is depressed;

(i) The electronics is programmed to discontinue the operation of the dual-rotor motor as an electric braking generator regardless of the depression of the brake pedal and to brake the vehicle only with the wheel brakes via the wheel brakes actuator in response to the depression of the brake pedal when a difference between the rotational speeds of the wheels of any one of the two drive axles larger than a respective predetermined difference is detected, or when a difference between the rotational speeds at the inputs of the two drive axles larger than a respective predetermined difference is detected, wherein said predetermined speed differences vary with the variation of the steering angle of the steering wheel 71. Otherwise said, the electronics is programmed to discontinue the operation of the dual-rotor motor as an electric braking generator regardless of the depression of the brake pedal, and to brake the vehicle only via the wheel brakes in response to the depression of the brake pedal when a pending lockup of any of the wheels of the vehicle is detected.

(j) The electronics is programmed to brake the vehicle with the wheel brakes via the wheel brakes actuator in response to the depression of the brake pedal when the electric battery is fully charged; and (k) The electronics is programmed, when it detects that the vehicle is not moving or is moving backward, to apply the wheel brakes via the wheel brakes actuator in response to the depression of the brake pedal, and thus to prevent unintentional motion of the vehicle or to brake the vehicle during a backward motion respectively.

It is evident from the described above program of the electronics and the operation of the vehicle that the internal-combustion engine starts when is not involved mechanically in the propulsion of the vehicle, never idle, and never operates at rotational speeds lover than a predetermined rotational speed within its optimum fuel-efficiency speed range. This arrangement provides for an easy stat and high fuel efficiency of the engine, which are other major advantages of this invention over most of the known parallel hybrid electric vehicles.

The first predetermined speed of the vehicle is selected to be the speed that the vehicle would have if the internal-combustion engine operating at a speed equal to said predetermined substantially constant rotational speed within its optimum fuel efficiency speed range drives the wheels of the first drive axle through the third mechanical drive train. The second predetermined speed of the vehicle is slightly lower than the first predetermined speed, so that, if the engine is started during acceleration of the vehicle at that second predetermined speed, the engine would have enough time to accelerate up to the predetermine substantially constant rotational speed before the vehicle have reached its first predetermined speed. At such operational program, the engine operates at the predetermined substantially constant speed within its optimum fuel efficiency speed range during any change from forward/low-speed/four-wheel-drive mode to any of the two forward/high-speed drive modes and vice versa. Such an arrangement provides for a perfectly smooth frictionless operation of the clutch, because the two components of the third drive train which the clutch engages or disengages during any change of the drive mode rotate with the same speeds.

If the optimum fuel efficiency speed range of the engine is relatively narrow, then the substantially constant rotational speed at which the engine operates when the clutch is disengaged (forward/low-speed/four-wheel-drive, reverse/four-wheel-drive, and electric braking in high-speed drive) is predetermined by the vehicle designer and recorded in the program of the electronics.

If the optimum fuel efficiency speed range of the engine is relatively wide, then the electronics may be arranged and programmed to enable the operator of the vehicle to pre-select a lower or a higher substantially constant rotational speed of the engine, among several speeds of the engine within its optimum fuel efficiency speed range, depending on the specific operational conditions of the vehicle. In such a case, the electronics is arranged and programmed at any change of the predetermined substantially constant rotational speed of the engine to automatically change accordingly the first and second predetermined speed of the vehicle, so that the relationship between these three speeds remain as described above. The operator of the vehicle pre-selects a specific substantially constant rotational speed of the engine within its optimum fuel efficiency speed range via an appropriate switch or other device connected with the electronics 64, which device and connection are not shown for simplicity of drawing and description.

In some embodiments, the electric generator 52 may be further arranged to selectively operate as an electric traction motor, and the generator controller 58 may be further arranged to selectively operate the generator as an electric traction motor powered by the battery 56. In such an arrangement, the electronics 64 is further arranged and programmed to operate the generator as an electric traction motor when a speed of the vehicle higher than the first predetermined speed is detected and the accelerator pedal 63 is fully depressed by the operator of the vehicle. In this specification, the expression "fully depressed" means that the accelerator pedal is depressed beyond a predetermined for normal operation of the vehicle maximum depression. Under such conditions, the electronics also operates the dual-rotor motor at its maximum torque-speed output and the internal-combustion engine at its richest fuel supply. Such an arrangement allows the combined power output of the engine, dual-rotor motor, and electric generator to be used for driving the vehicle in a high-speed/extreme-power/four-wheel-drive mode when (for example, during passing) a very high acceleration is demanded due to some exceptional road circumstances.

In the described above high-speed/extreme-power/four-wheel drive mode, the battery supplies both the generator and the dual-rotor motor with electric power and the magnitude of the electrical current drawn from the battery may be very high. Therefore, for protecting the battery, the electronics shall be programmed to allow this operational mode for a predetermined relatively short time period.

In this specification the expression "in response to the depression of the accelerator pedal" means that the control signals from the central electronic controller to the dual-rotor motor controller and to the internal-combustion engine controller respectively are functions of the control signal from the depression of the accelerator pedal. In this specification the expression "in response to the depression of the brake pedal" means that the control signals from the central electronic controller to the dual-rotor motor controller (when the dual-rotor motor operates as an electric braking generator) and to the wheel brakes actuator respectively are functions of the control signal from the depression of the brake pedal. This arrangement and program of the electronics provide immediate, direct, and linier control of the continuously variable tractive and braking forces via the accelerator and brake pedals of the vehicle respectively. This is one of the major advantages of this invention in comparison to the prior art.

In some embodiments, the vehicle is further equipped with a cruise control system for automatically maintaining a substantially constant cruising speed of the vehicle. In such a case, the electronics 64 is further programmed, when the cruise control system is turned on and the cruising speed is set up by the operator of the vehicle, to automatically operate the internal-combustion engine and the dual-rotor motor respectively for maintaining the selected cruising speed of the vehicle substantially constant if the accelerator pedal and brake pedal are not depressed by the operator of the vehicle. The electronics is also programmed to return to the normal control of the tractive force by the acceleration pedal when the accelerator pedal is depressed by the operator of the vehicle, and to return to the normal control of the braking force by the brake pedal when the brake pedal is depressed by the operator of the vehicle, wherein at the depression of the accelerator pedal the cruise control setup is not canceled, and at the depression of the brake pedal the cruise control setup is canceled. However, for simplicity of drawing and description, the control button-switches by which the operator of the vehicle manually turns on or off the cruise control and sets or resets the cruising speed, and the relationship of said button-switches with the electronics are not shown.

In some embodiments, the electronics 64 is further arranged and programmed to continuously monitor the rotational speeds of the first and second rotors 19, 20 and to disconnect the dual-rotor motor 17 from the electric power source if a speed of either rotor higher than its predetermined maximum safe rotational speed is detected. Thus the electronics will automatically protect the rotors of the dual-rotor motor from destruction due to a lack of external loads and a consequential over-speeding.

In some embodiments, the clutch actuator 57 may be further arranged to automatically engage the clutch 51 when the vehicle is parked and the master switch of the vehicle is turned off, i.e. when the electronics does not control the clutch actuator. If the clutch is engaged under such conditions, the internal combustion engine will provide a motion resisting force, which will improve the safety against an unintentional motion of the vehicle. As it is clear for the skilled in the art, the specific arrangement of the engagement of the clutch, when the vehicle is parked, depends on the specific type of the clutch and the method of its operation.

Since in high-speed/four-wheel-drive mode the internal-combustion engine and the two rotors of the dual-rotor motor together drive the wheels of the vehicle, the maximum rotational speeds of these components shall match as well as possible. For example, if the maximum speed of the internal-combustion engine is 4500 revolutions/min, the speed reduction ratio of the first drive train is 6:1, the speed reduction ratio of the second drive train is 3:1, the speed reduction ratio of the third drive train is 3:1, and the rolling radiuses of all four driving wheels are the same, then the first rotor shall be designed to rotate safely at 9000 revolutions/min, and the second rotor shall be designed to rotate safely at 4500 revolutions/min. At these reduction ratios the drive system will produce maximum rotational speed of the vehicle wheels equal to 1500 revolutions/min, and the tractive or braking forces transmitted from the first rotor to the wheels of the first drive axle will be two times larger than the tractive or braking forces transmitted from the second rotor to the wheels of the second drive axle respectively.

Referring in sequence from FIG. 2 to FIG. 9, only what is different in comparison with the embodiment of FIG. 1 is hereinafter described.

Figure 2:
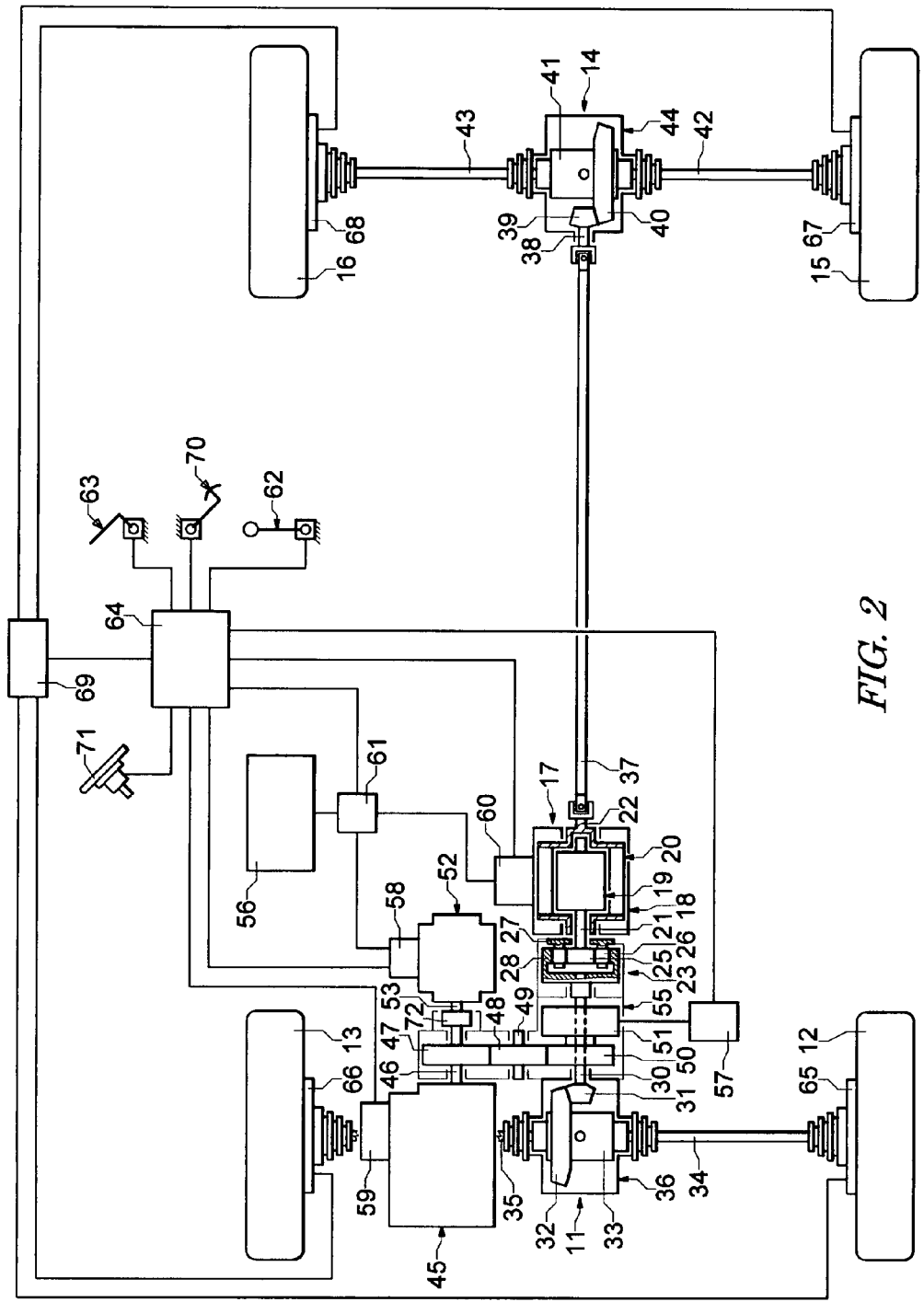
FIG. 2 is a schematic illustration of a second embodiment of a vehicle according to this invention.

Referring to FIG. 2, the engine 45 is located above the first drive axle 11. In the first drive train the ring gear 28 of the planetary gear reducer 23 is coupled with the input shaft 30 of the first drive axle, and the enclosure 36 of the first drive axle is firmly attached to or integrated with the transmission enclosure 55. In the first drive train the clutch gear 50 and the clutch 51 are mounted onto the input shaft of the first drive axle. The function of the clutch is the same as described with FIG. 1. Here, when the clutch is engaged the clutch gear 50 is coupled with the input shaft 30 of the first drive axle, and when the clutch is disengaged the clutch gear is not coupled with the input shaft of the first drive axle, but is rotatably supported by that shaft. In the fourth drive train the output shaft 46 of the internal-combustion engine is directly coupled with the input shaft 53 of the electric generator 52 through a coupling 72. In this embodiment, all major drive components, with the exception of the second drive axle, are located close to the first drive axle. All other components and the operation of the vehicle are the same as described with FIG. 1.

Figure 3:
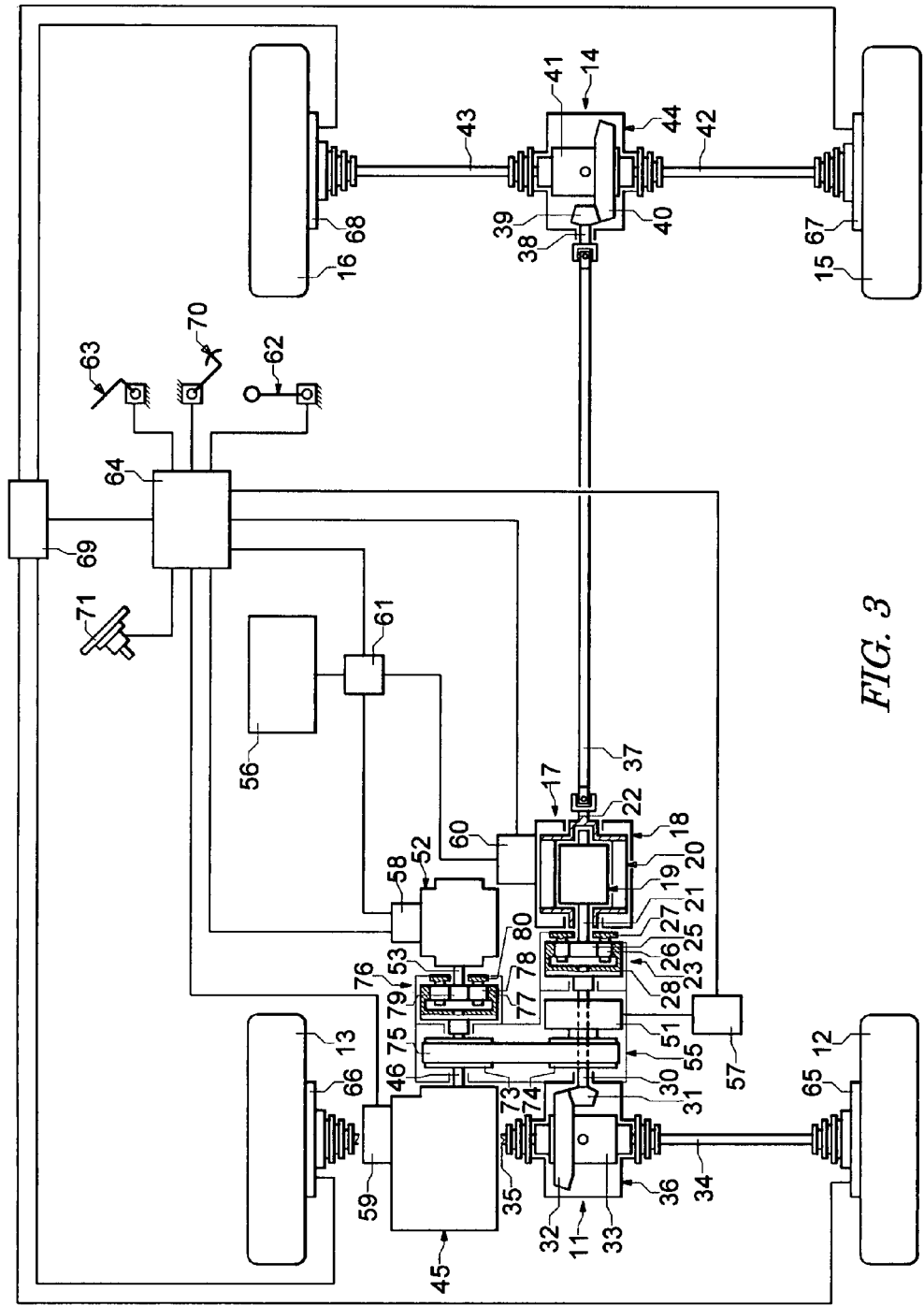
FIG. 3 is a schematic illustration of a third embodiment of a vehicle according to this invention.

Referring to FIG. 3, the location of the engine 45, the attachment or integration of the transmission enclosure 55 and the first axle enclosure 36, and the arrangement of the first mechanical drive train, are the same as described with FIG. 2. In this embodiment, the third mechanical drive train includes a sprocket wheel 73 coupled with the output shaft 46 of the engine 45, a clutch sprocket wheel 74 mounted onto the input shaft 30 of the first drive axle, and a chain 75 engaged with said two sprocket wheels 73, 74 for transmitting mechanical energy between the two sprocket wheels. The function of the clutch 51 remains the same as described with FIG. 1. Here, when the clutch is engaged it couples the clutch sprocket wheel 74 with the input shaft 30 of the first drive axle, and when the clutch is disengaged the clutch sprocket wheel is not coupled with the input shaft of the first drive axle and may rotate freely upon that shaft. In this embodiment, the fourth drive train includes a planetary-gear drive 76 for driving the generator with a higher rotational speed than the rotational speed of the engine. A ring gear 77 of the planetary-gear drive 76 is coupled with the engine output shaft 46 and is engaged with the planet gears 78, and a sun gear 79 of the planetary-gear drive is coupled with the generator input shaft 53 and is engaged with of the planet gears 78. The planetary-gear drive 76 is within the transmission enclosure 55. A carrier 80 of the planet gears 78 is firmly attached to the transmission enclosure, and the ring gear 77 is rotatably supported by the transmission enclosure. All other components and the operation of the vehicle are the same as described with FIG. 1.

Figure 4:
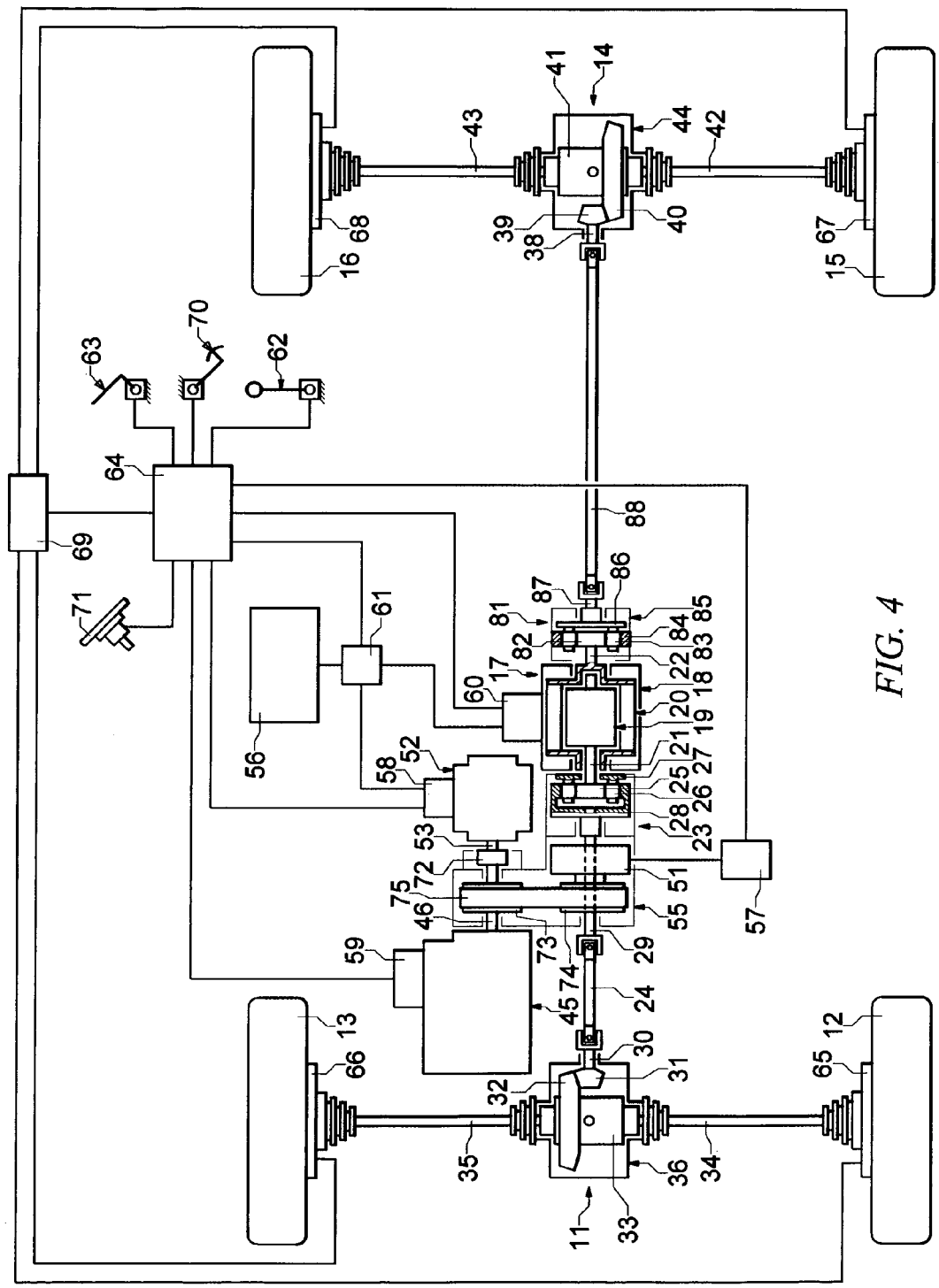
FIG. 4 is a schematic illustration of a fourth embodiment of a vehicle according to this invention.

Referring to FIG. 4, the third drive train includes the chain drive 73, 74, 75 as described with FIG. 3, and the fourth drive train is as described with FIG. 2. In addition, in this embodiment, a second planetary-gear type reducer 81 is included in the second drive train. A sun gear 82 of said second planetary gear reducer is coupled with the output shaft 22 of the second rotor 20 and is engaged with planet gears 83, which planet gears are also engaged with a ring gear 84 of the planetary gear reducer 81. The ring gear 84 is immobile, firmly attached to an enclosure 85 of the second planetary gear reducer, which enclosure is firmly attached to the enclosure 18 of the dual-rotor motor 17. A carrier 86 of the planet gears 83 is rotatably supported within the enclosure 85 and is coupled with an output shaft 87 of the second planetary gear reducer. In this arrangement, the output shaft 87 of the second planetary gear reducer rotates in the same direction as that of the output shaft 22 of the second rotor. A cardan shaft 88 connects the output shaft 87 of the second planetary gear reducer with the input shaft 38 of the second drive axle.

A second reducer, as described in this embodiment, may be included in the second drive train if larger total torque must be delivered from the dual-rotor motor to the driving wheels of the vehicle. In such an arrangement, a correct proportion between the electric braking forces of the wheels of the first and second drive axles may be easily set up by selecting the proportion between the speed reduction ratios of the first and second planetary-gear type reducers 23, 81. For example, if the speed reduction ratios of the two drive axles are the same and the rolling radiuses of all four wheels are the same, and if for safe braking of the vehicle a proportion of 1.5:1 between the braking forces of the wheels of the first and second drive axle is required, then a reduction ratio 3:1 of the first planetary-gear type reducer (23) and a reduction ratio 2:1 of the second planetary-gear type reducer (81) shall be selected. All other components and the operation of the vehicle are the same as described with FIG. 1.

Figure 5:
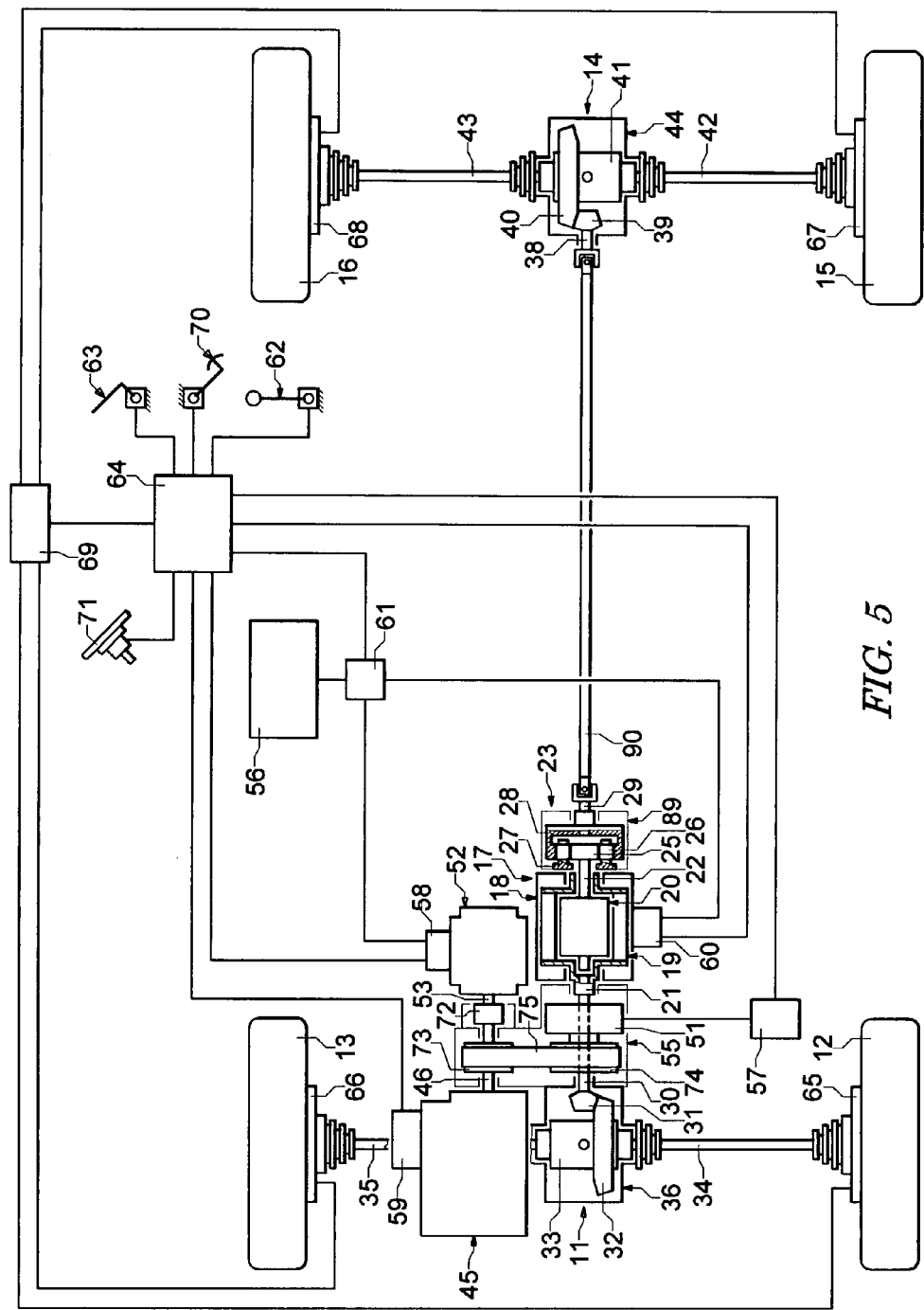
FIG. 5 is a schematic illustration of a fifth embodiment of a vehicle according to this invention.

Referring to FIG. 5, the first drive axle 11 is assumed to be the rear axle and the second drive axle 14 is assumed to be the front axle of the vehicle. The location of the engine 45 is as described with FIG. 2. In this embodiment, the planetary gear reducer 23 is included in the second drive train for providing a larger speed reduction ratio than that of the first drive train, and consequently—larger electric braking forces on the wheels 15, 16 of the second (front) drive axle, which are required for safe electric braking of the vehicle. In such an arrangement, the second rotor will rotate faster than the first rotor. That is why in this embodiment the first rotor 19 is the outer rotor and the second rotor 20 is the inner rotor of the dual-rotor motor 17.

In this embodiment, in the first drive train the input shaft 30 of the first (rear) drive axle is coupled with the output shaft 21 of the first rotor 19. In the second drive train the sun gear 25 of the planetary gear reducer 23 is coupled with the output shaft 22 of the second rotor 20 and is engaged with the planet gears 26. The planet gears are engaged with the ring gear 28, which is rotatably supported within an enclosure 89 of the planetary gear reducer. The output shaft 29 of the planetary gear reducer is coupled with the ring gear 28. The carrier 27 of the planet gears 26 is immobile and is firmly attached to the enclosure 89, which is firmly attached to the enclosure 18 of the dual-rotor motor. The enclosure 18 of the dual-rotor motor is firmly attached to the transmission enclosure 55. A cardan shaft 90 connects the output shaft 29 of the planetary gear reducer with the input shaft 38 of the second drive axle. For proper direction of rotation of the vehicle driving wheels, at standard rotation of the engine output shaft, the two drive axles are with inverted (left) location of the crown gears 32, 40 of their final drives, as shown in the drawing. The arrangement of the third drive train is as described with FIG. 3, and the arrangement of the fourth drive train is as described with FIG. 2. All other components and the operation of the vehicle are the same as described with FIG. 1.

Figure 6:
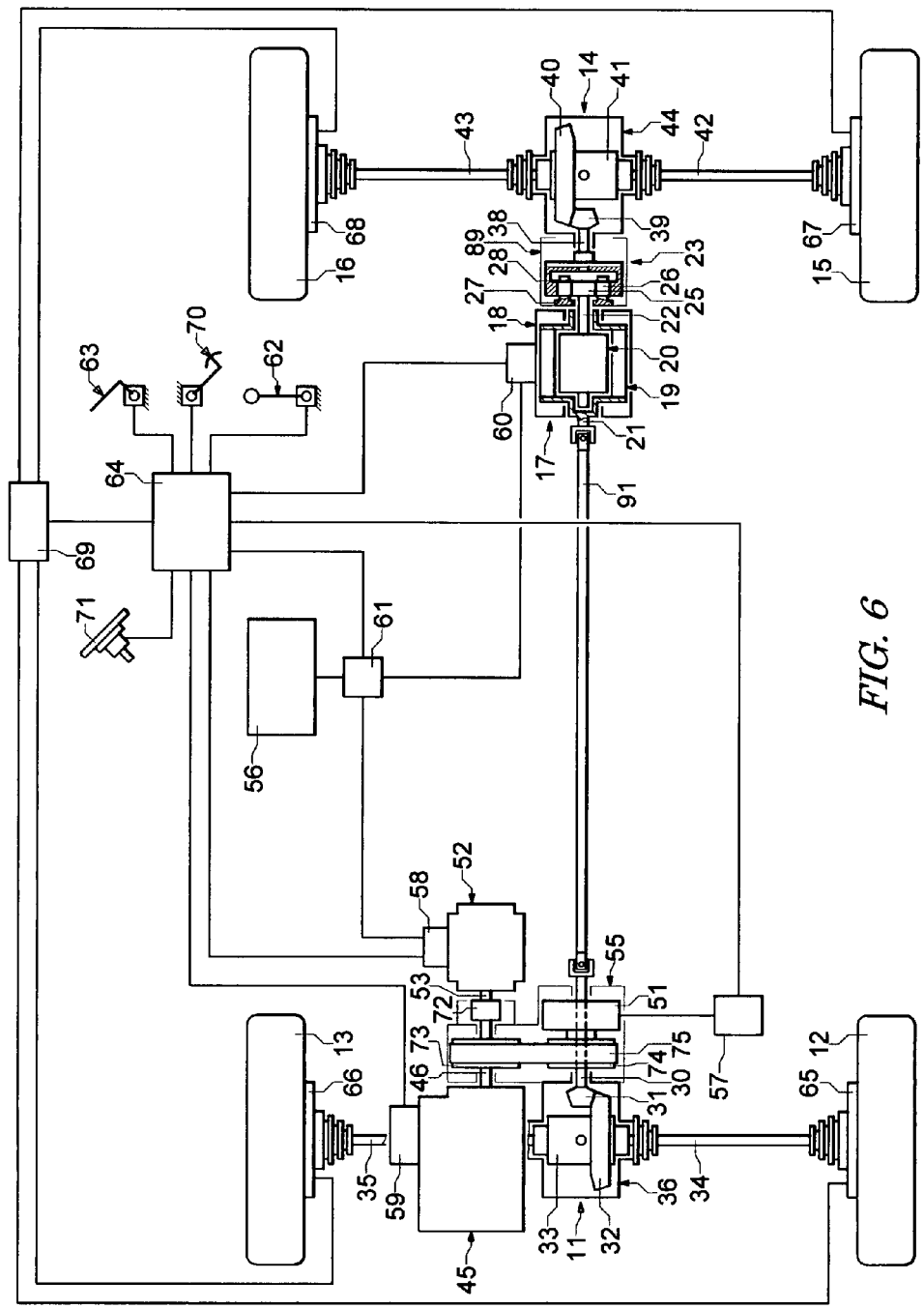
FIG. 6 is a schematic illustration of a sixth embodiment of a vehicle according to this invention.

Referring to FIG. 6, the first drive axle 11 is assumed to be the rear axle, and the second drive axle 14 is assumed to be the front axle of the vehicle. The major difference between this embodiment and the embodiment described with FIG. 5 is that here the dual-rotor motor 17 and the planetary gear reducer 23 are located near the second (front) drive axle 14. In the first drive train a cardan shaft 91 connects the output shaft 21 of the first rotor 19 with the input shaft 30 of the first (rear) drive axle. The ring gear 28 of the planetary gear reducer is coupled with the input shaft 38 of the second (front) drive axle. The enclosure 89 of the planetary gear reducer is firmly attached to or integrated with the enclosure 44 of the second drive axle, and the enclosure 18 of the dual-rotor motor is firmly attached to the enclosure 89 of the planetary gear reducer. The entire block of these three enclosures is firmly attached to the frame of the vehicle, which attachment is not shown for simplicity of drawing and description. Such a divided location of the engine and dual-rotor motor provides a better distribution of the weight. The arrangements of the third and fourth drive trains are the same as described with FIG. 5. All other components and the operation of the vehicle are the same as described with FIG. 1.

Figure 7:
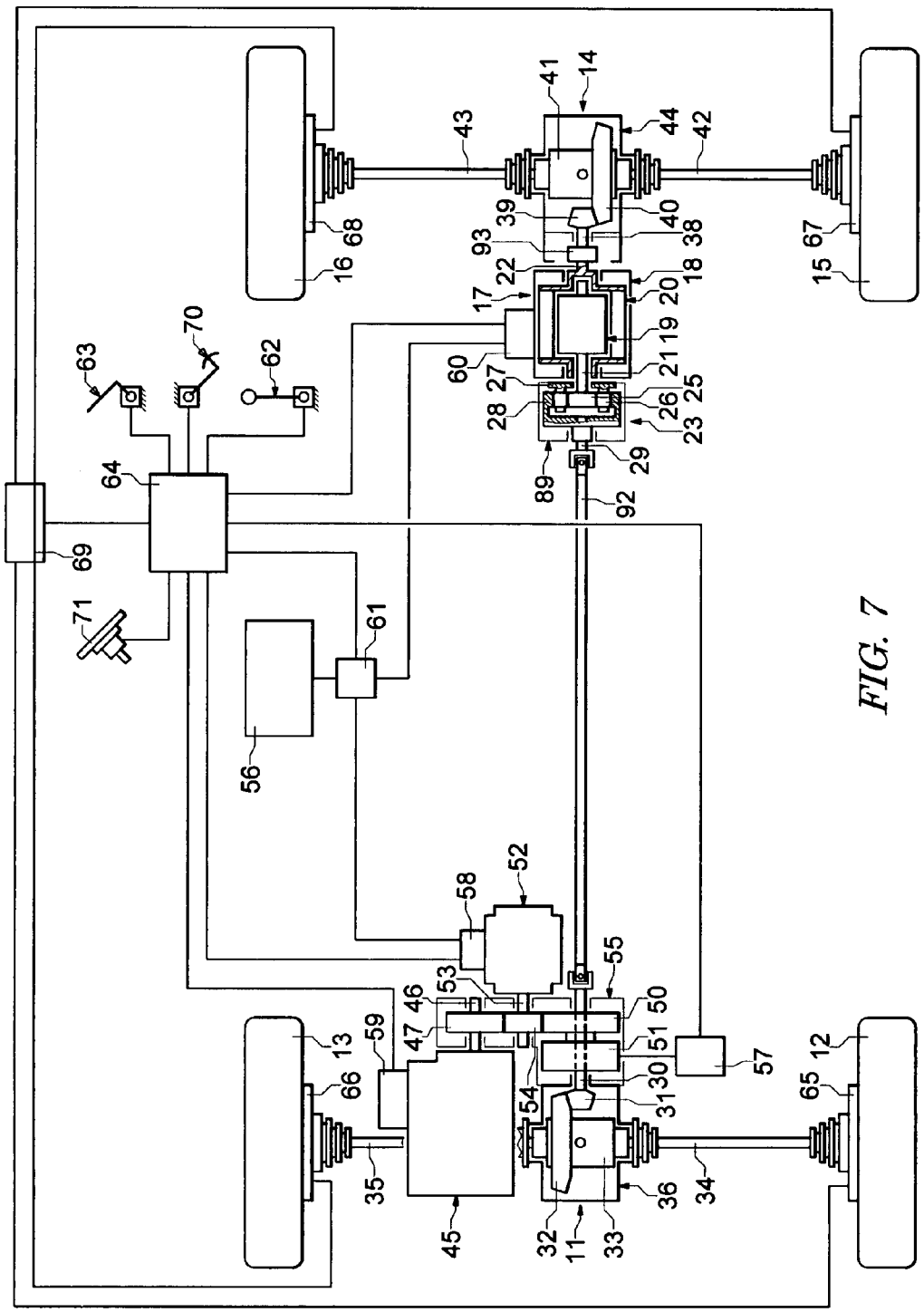
FIG. 7 is a schematic illustration of a seventh embodiment of a vehicle according to this invention.

Referring to FIG. 7, the dual-rotor motor 17 and the planetary reducer 23 are located close to the second drive axle. In this embodiment, the first drive axle 11 is the front axle and the second drive axle 14 is the rear axle of the vehicle, as it is with all described embodiments but those described with FIG. 5 and FIG. 6. The engine 45 is located as described with FIG. 2. The planetary gear reducer 23 is included in the first drive train. A cardan shaft 92 connects the output shaft 29 of the planetary gear reducer with the input shaft 30 of the first drive axle. The output shaft 22 of the second rotor 20 is coupled with the input shaft 38 of the second drive axle through a coupling 93.

The enclosure 18 of the dual-rotor motor is firmly attached to the enclosure 44 of the rear axle, and the enclosure 89 of the planetary reducer is firmly attached to the enclosure of the dual-rotor motor. The entire block of these three enclosures is firmly attached to the frame of the vehicle, which attachment is not shown for simplicity of drawing and description. In the third drive train, the gear 47 coupled with the output shaft 46 of the engine is engaged with the gear 54, which is coupled with the output shaft 53 of the generator and is engaged with the clutch gear 50. It is clear that the gears 47 and 54 are parts of both third and fourth drive trains. The clutch gear 50 is mounted onto the input shaft 30 of the first drive axle. The clutch 51 is also mounted onto the input shaft 30 of the first drive axle. In this embodiment, it is assumed that when the clutch is engaged the clutch gear is coupled with the input shaft of the first drive axle, and when the clutch is disengaged the clutch gear is not coupled with the input shaft of the first drive axle and may rotate freely upon the input shaft of the first drive axle. All other components and the operation of the vehicle are as described with FIG. 1.

Figure 8:
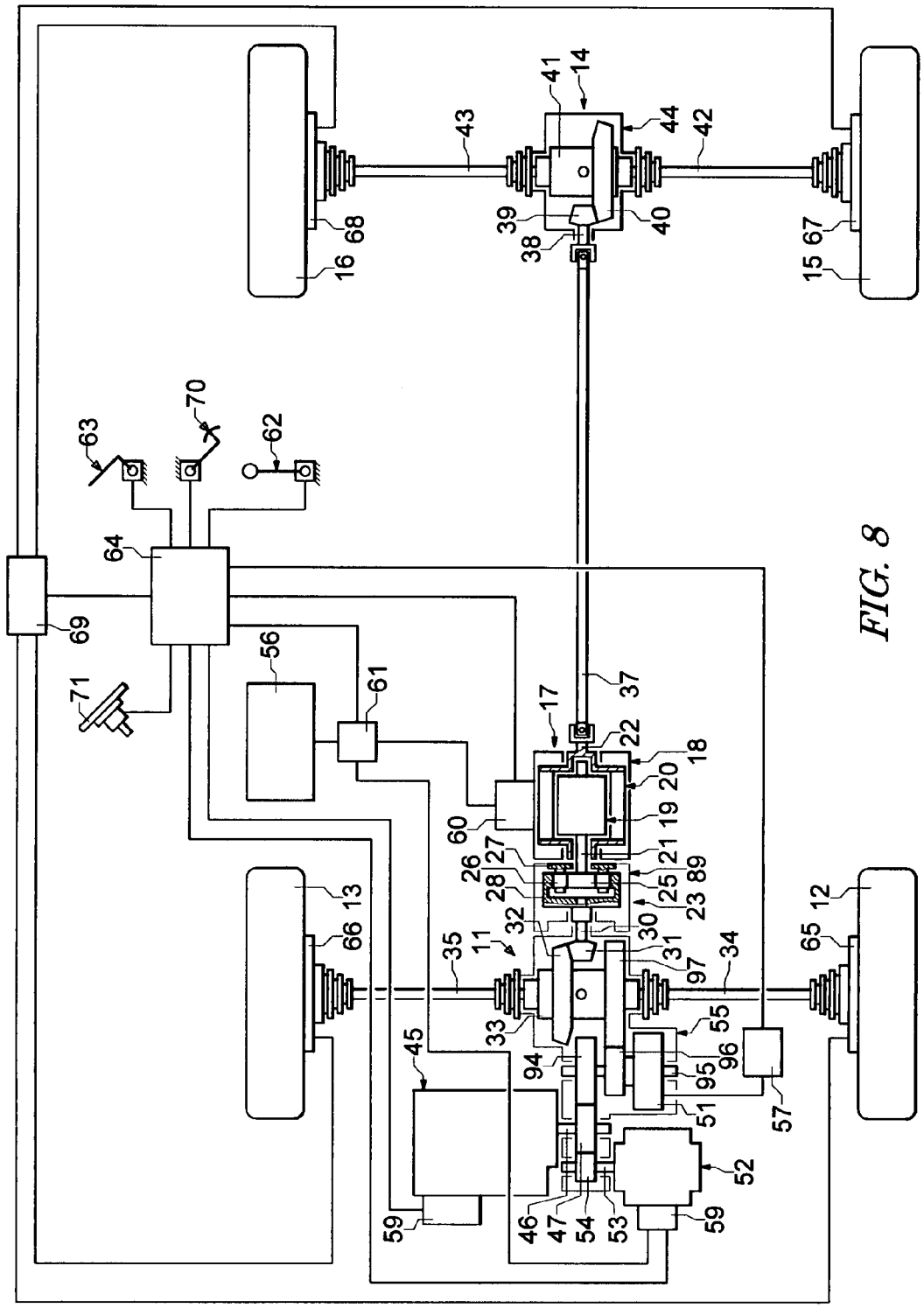
FIG. 8 is a schematic illustration of an eighth embodiment of a vehicle according to this invention.

Referring to FIG. 8, the engine 45 is located above the first drive axle 11 in a transversal configuration. In this embodiment, in the first drive train the ring gear 28 of the planetary gear reducer 23 is coupled with the input shaft 30 of the first drive axle 11. The ring gear 28 is rotatably supported by an enclosure 89 of the planetary gear reducer. In the third drive train the gear 47 coupled with the output shaft 46 of the engine is engaged with a gear 94, which gear 94 is coupled with a clutch shaft 95 rotatably supported within the transmission enclosure 55. A clutch gear 96 is mounted onto the clutch shaft 95 and is connected to the clutch 51, which in this embodiment is also mounted onto the clutch shaft 95. The clutch gear 96 is engaged with a gear 97 coupled with the differential 33 of the first drive axle.

In this embodiment, it is assumed that when the clutch 51 is engaged the clutch gear 96 is coupled with the clutch shaft 95, and when the clutch is disengaged the clutch gear is not coupled with the clutch shaft and may rotate freely upon the clutch shaft. Therefore, when the clutch is disengaged the transmission of mechanical energy between the internal-combustion engine and the wheels of the first drive axle is interrupted. In this embodiment, the enclosure of the first drive axle is integrated with the transmission enclosure. The enclosure 89 of the planetary gear reducer 23 is firmly attached to or integrated with the transmission enclosure. The shafts of the first, third, and fourth drive trains are rotatably supported and, along with all gears of these three drive trains, are enclosed within the transmission enclosure. The engine 45 and the generator 52 are firmly attached to the transmission enclosure. The entire block of engine and transmission enclosure is appropriately firmly attached to the frame of the vehicle, which attachment is not shown for simplicity of drawing and description. All other components and the operation of the vehicle are the same as described with FIG. 1.

Figure 9:
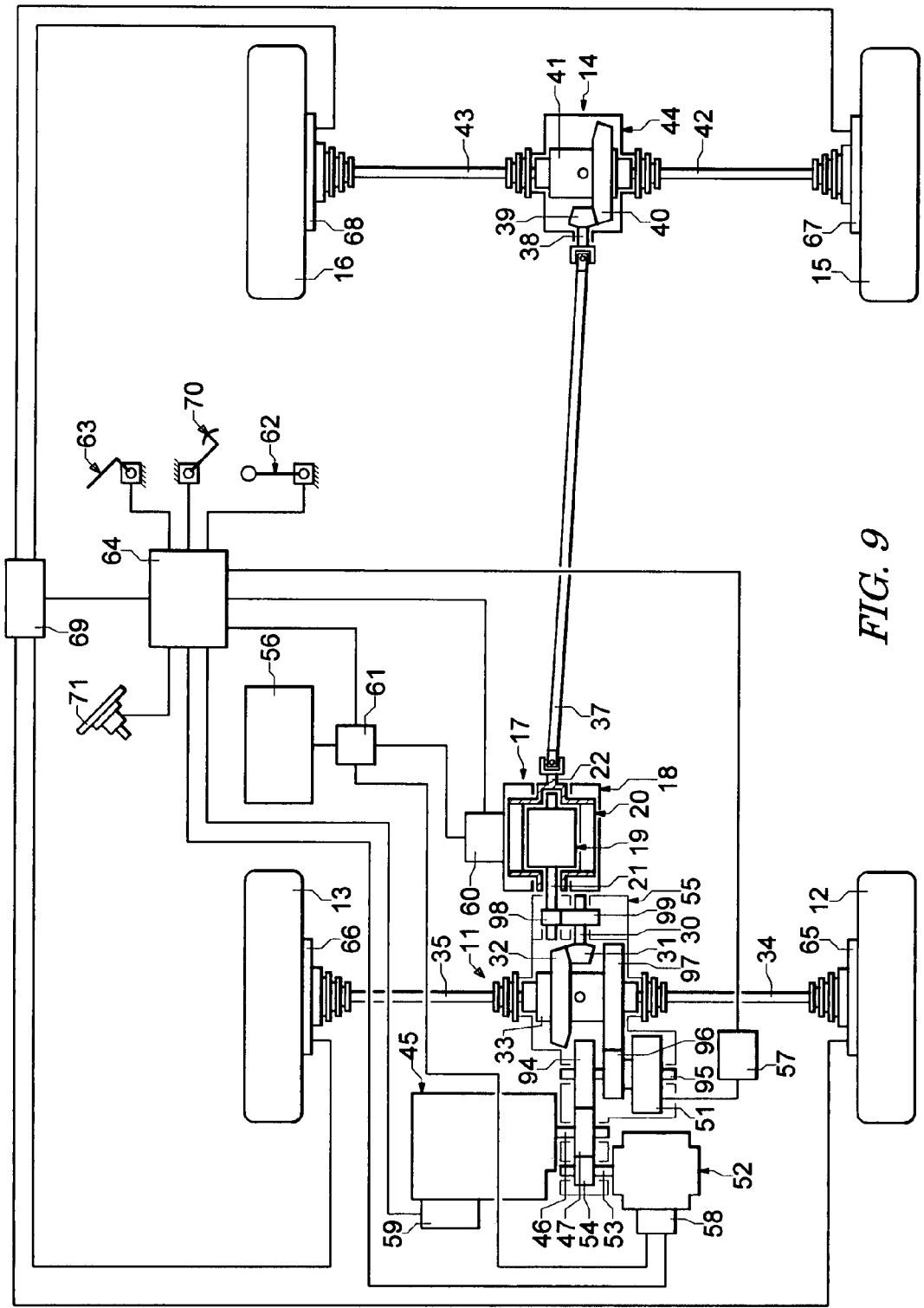
FIG. 9 is a schematic illustration of a ninth embodiment of a vehicle according to this invention.

Referring to FIG. 9, the engine 45 is located transversely as described with FIG. 8. In fact, the only difference between this embodiment and the embodiment described with FIG. 8 is the arrangement of the first drive train. Here, the planetary gear reducer 23 (shown in FIG. 8) is replaced by a gear 98 coupled with the output shaft 21 of the first rotor 19 and engaged with a larger gear 99 coupled with the input shaft 30 of the first drive axle 11. The output shaft of the first rotor and the input shaft of the first drive axle with the respective gears 98, 99 are rotatably supported within the transmission enclosure. Though the axis of the dual-rotor motor 17 is shown here in the plane of the drawing, actually it may be in the central vertical plane of the vehicle above the input shaft 30 of the firs drive axle, or in any other position around and in parallel to the input shaft of the first drive axle, for providing larger ground clearance or an otherwise better location of the dual-rotor motor. In fact, this is the only reason for including the above described single-stage gear reducer (gears 98 and 99) in the first drive train of this embodiment, instead of the planetary gear reducer 23. The arrangement of the third drive train is the same as described with FIG. 8. All other components and the operation of the vehicle are the same as described with FIG. 1.

From the above detail descriptions it is clear that in the embodiments illustrated by the drawings in FIG. 1 to FIG. 9 only the locations of some of the major components and the specific arrangements of the four mechanical drive trains of the vehicle are more or less different. The method of operating the components of the power train and the method of driving and braking the vehicle are the same in each of these embodiments. These several embodiments of a vehicle according to this invention illustrate that many different locations of the engine, dual-rotor motor, and electric generator, and specific arrangements of the four mechanical drive trains are possible. It is clear for the skilled in the art that a number of other combinations may also be derived from the already described embodiments, as well as that many other embodiments of a vehicle according to this invention are possible. For example, the engine, third drive train, and fourth drive train may be as shown and described with FIG. 2, and the dual-rotor motor, planetary gear reducer, first drive train, and second drive train may be as shown and described with FIG. 7. Or the engine, third drive train, and fourth drive train may be as shown and described with FIG. 3, and the dual-rotor motor, planetary gear reducer, first drive train, and second drive train may be as shown and described with FIG. 7. Or the engine, dual-rotor motor, first drive train, third drive train, and fourth drive train may be as shown and described with FIG. 8, and a second planetary reducer may be included in the second drive train as shown and described with FIG. 4. Or the first and second drive trains may include no other speed reducing mechanisms but the respective axles final drives. Or the rotational speed reducers included in the drive trains may be of types that are different from those in the described embodiments. Or the electric generator may be attached to the engine side of the transmission enclosure in parallel to the engine or to be sandwiched between the engine and the transmission enclosure with the fourth drive train arranged in a suitable manner, etc. All such other locations of the components or specific arrangements of each of the four mechanical drive trains, however, will represent just other embodiments of the hybrid electric vehicle described herein, and are therefore covered by the anticipated scope of the appended claims.

It is also clear that the speed reduction ratios of any one of the four mechanical drive trains may be selected in accordance with the specific characteristics and limitations of the engine, dual-rotor motor, and generator, desired performance characteristics of the drive and braking systems, and other design considerations.

It is also evident that each of the components of a hybrid electric vehicle as described herein may be of a different specific kind, type, and design, appropriate to perform the functions disclosed herein. For example, the internal-combustion engine may be a reciprocating-piston gas or diesel engine, or a gas turbine, or another type of internal-combustion engine, the electric generator and the dual-rotor motor each may be a direct-current or an alternating-current electrical machine, etc. The incorporation of components of different specific kinds or types will simply produce different specific embodiments of a vehicle according to this invention.

What is claimed is:

1. A vehicle comprising:
   a first drive axle including two wheels for driving the vehicle and a second drive axle including two wheels for driving the vehicle, wherein said two wheels of at least one of said two drive axles are also steerable for steering the vehicle;
   a dual-rotor electric traction motor for selectively driving simultaneously the wheels of the two drive axles, said dual-rotor motor including a first rotor for driving the wheels of said first drive axle and a second rotor for driving the wheels of said second drive axle, wherein when the dual-rotor motor is energized said two rotors are propelled to rotate in opposite directions under the action of the same electromagnetic forces, and wherein said opposite directions of rotation of the two rotors are reversible;
   an electric power source for supplying the dual-rotor motor with electric energy, said electric power source including an electric battery for storing electric energy and selectively supplying the dual-rotor motor with electric energy and an electric generator for charging said electric battery and selectively supplying the dual-rotor motor with electric energy;
   an internal-combustion engine for selectively driving said electric generator or the wheels of the first drive axle and the electric generator;
   a clutch for selectively interrupting the transmission of mechanical energy between the internal-combustion engine and the wheels of the first drive axle; and
   a central electronic controller arranged and programmed to control and coordinate the operation of the dual-rotor motor, internal-combustion engine, and said clutch, for operating the vehicle in a plurality of drive modes and charging the electric battery, wherein said plurality of drive modes includes:
   a forward/low-speed/four-wheel-drive mode, wherein at speeds of the vehicle lower than a predetermined speed the clutch is disengaged, the dual-rotor motor alone drives the vehicle, and the internal-combustion engine drives the electric generator or rests;
   a forward/high-speed/two-wheel-drive mode, wherein at speeds of the vehicle higher than said predetermined speed the clutch is engaged, the internal-combustion engine alone drives the vehicle while also driving the electric generator, and the dual-rotor motor does not operate,
   a forward/high-speed/four-wheel-drive mode, wherein at speeds of the vehicle higher than the predetermined speed the clutch is engaged and both the internal-combustion engine and the dual-rotor motor together drive the vehicle; and
   a reverse/four-wheel-drive mode, wherein the clutch is disengaged, said opposite directions of rotation of both rotors are reversed, the dual-rotor motor alone drives the vehicle backward, and the internal-combustion engine drives the electric generator or rests.

2. A vehicle according to claim 1, wherein said first drive axle is a front axle of the vehicle and said second drive axle is a rear axle of the vehicle.

3. A vehicle according to claim 1, wherein said first drive axle is a rear axle of the vehicle and said second drive axle is a front axle of the vehicle.

4. A vehicle according to claim 1, wherein said first rotor is an inner rotor and said second rotor is an outer rotor coaxial to said inner rotor.

5. A vehicle according to claim 1, wherein said first rotor is an outer rotor and said second rotor is an inner rotor coaxial to said outer rotor.

6. A vehicle according to claim 1, and further comprising:
   a first mechanical drive train connecting said first rotor with said wheels of said first drive axle for transmitting mechanical energy between the first rotor and the wheels of the first drive axle;
   a second mechanical drive train connecting said second rotor with said wheels of said second drive axle for transmitting mechanical energy between the second rotor and the wheels of the second drive axle;
   a third mechanical drive train connecting said internal-combustion engine with the wheels of the first drive axle for transmitting mechanical energy between the internal-combustion engine and the wheels of the first drive axle, wherein said third drive train includes said clutch and a part of said first drive train; and
   a fourth mechanical drive train connecting the internal-combustion engine with said electric generator for transmitting mechanical energy between the internal-combustion engine and the electric generator.

7. A vehicle according to claim 1, wherein said electric generator is further arranged to selectively operate as an electric motor powered by said electric battery for starting said internal-combustion engine.

8. A vehicle according to claim 6, wherein the proportion between speed reduction ratios of said first and second mechanical drive trains is approximately equal to a predetermined preferred-for-safe-braking-of-the-vehicle proportion between the braking forces on said wheels of said first and second drive axles.

9. A vehicle according to claim 7, and further comprising:
   a clutch actuator for engaging or disengaging said clutch;
   an electric generator controller for automatically controlling the operation of said electric generator and further arranged for selectively operating the electric generator as an electric motor;
   an internal-combustion engine controller for operating said internal-combustion engine;
   a dual-rotor motor controller for operating said dual-rotor motor;

an electric battery charger electrically connecting said electric generator controller, electric battery, and dual-rotor motor controller to each other respectively, and arranged for selectively disconnecting the electric generator controller, electric battery, and dual-rotor motor controller from each other respectively;

a directional mode control switch controllable by the operator of the vehicle for pre-selecting a forward drive mode preparing the dual-rotor motor for driving the vehicle forward, a backward drive mode preparing the dual-rotor motor for driving the vehicle backward, and a neutral drive mode rendering the dual-rotor motor not operable; and an accelerator pedal controllable by the operator of the vehicle for providing continuously variable control of the tractive force of the vehicle by varying the depression of said accelerator pedal.

10. A vehicle according to claim 9, wherein said clutch actuator is further arranged to automatically engage said clutch when the vehicle is parked and said central electronic controller is not controlling the operation of the clutch.

11. A vehicle according to claim 9, wherein said electric battery charger is further arranged for selectively charging said electric battery from an external source of electric energy when the vehicle is parked and does not operate and the electric battery charger is electrically connected to said external source of electric energy.

12. A vehicle according to claim 9, wherein said central electronic controller is arranged to continuously monitor the direction of motion, speed, and acceleration of the vehicle, the depression of said accelerator pedal, the rotational output speed of said internal-combustion engine, the state of charge of said electric battery, and the magnitude of the electric current drawn from the electric battery, and wherein said central electronic controller is arranged to control the operation of said clutch, electric generator, dual-rotor motor, internal-combustion engine, and the charging of the electric battery via said clutch actuator, electric generator controller, dual-rotor motor controller, internal-combustion engine controller, and battery charger respectively.

13. A vehicle according to claim 12, wherein said central electronic controller is programmed:

(a) to disengage said clutch, and to keep the clutch disengaged when the vehicle is not moving, when the vehicle is moving forward with speeds lower than a first predetermined speed, and when the vehicle is moving backward;

(b) to start said internal-combustion engine, if the internal-combustion engine is not already running, and to operate the internal-combustion engine at a predetermined substantially constant rotational speed when the vehicle is not moving, when the vehicle is moving forward with speeds lower than said first predetermined speed, and when the vehicle is moving backward, only if any of the following conditions is detected: (i) the charge of said electric battery is lower than a predetermined low level, (ii) the electric current drawn from the electric battery is stronger than a predetermined electric current, and (iii) the speed of the vehicle is between the first predetermined speed and a slightly lower second predetermined speed;

(c) to stop the operation of the internal-combustion engine, if the internal-combustion engine is already running, when the vehicle is not moving and the charge of the electric battery is higher than said predetermined low level;

(d) to stop the operation of the internal-combustion engine, if the internal-combustion engine is already running, when the vehicle is moving forward at speeds lower than said second predetermined speed and when the vehicle is moving backward, if the charge of the electric battery is higher than a predetermined high level and the electric current drawn from the electric battery is weaker than said predetermined electric current;

(e) to operate the internal-combustion engine at continuously variable torque-speed output in response to the depression of said accelerator pedal when the vehicle is moving forward at speeds higher than the first predetermined speed;

(f) to operate said dual-rotor motor at continuously variable torque-speed output in response to the depression of the accelerator pedal when the vehicle is moving forward at speeds lower than the first predetermined speed and when the vehicle is moving backward;

(g) to disconnect the dual-rotor motor from said electric power source regardless of the depression of the accelerator pedal when the vehicle is moving forward at speeds higher than the first predetermined speed and the internal-combustion engine alone is capable of sustaining the vehicle speed or of accelerating the vehicle to a higher speed in response to the depression of the accelerator pedal;

(h) to disconnect the electric generator from the electric battery and from the dual-rotor motor, to connect the dual-rotor motor to the electric battery, and to operate the dual-rotor motor at continuously variable torque-speed output in response to the depression of the accelerator pedal when the vehicle is moving forward at speeds higher than the first predetermined speed, the internal-combustion engine alone is not capable of sustaining the vehicle speed or of accelerating the vehicle to a higher speed in response to the depression of the accelerator pedal, and the charge of the electric battery is higher than the predetermined low level; and (i) to disconnect the electric battery from the electric generator when the internal-combustion engine operates and the charge of the electric battery is higher than said predetermined high level.

14. A vehicle according to claim 13, wherein said electric generator is further arrange to selectively operate as an electric traction motor powered by said electric battery, and said central electronic controller is further programmed to operate the electric generator as an electric traction motor via said electric generator controller when the vehicle moves forward with a speed higher than said first predetermined speed and said accelerator pedal is fully depressed.

15. A vehicle according to claim 13, wherein said first predetermined speed of the vehicle is the speed which the vehicle would have if said clutch is engaged and said internal-combustion engine operating at said predetermined substantially constant rotational speed drives the wheels of said first drive axle.

16. A vehicle according to claim 13, wherein said central electronic controller is further programmed to automatically operate said internal-combustion engine and said dual-rotor motor respectively for maintaining a substantially constant cruising sped of the vehicle when said cruising speed is selected and set up by the operator of the vehicle via a cruise control system.

17. A vehicle according to claim 13, wherein said dual-rotor motor is further arranged to selectively operate as an electric braking generator powered by the kinetic energy of the vehicle, said dual-rotor motor controller is further arranged to selectively operate the dual-rotor motor as an electric braking generator for converting part of the kinetic energy of the vehicle into electric energy charging said electric battery during speed retardation and braking of the vehicle, and wherein the vehicle further comprising:
- wheel brakes for braking the rotation of said wheels of said drive axle;
- a wheel brakes actuator for selectively applying said wheel brakes;
- a brake pedal controllable by the operator of the vehicle for providing continuously variable control of the braking force of the vehicle by varying the depression of said brake pedal; and
- a steering wheel controllable by the operator of the vehicle for varying the steering angle of said steerable wheels.

18. A vehicle according to claim 17, wherein said central electronic controller is further arranged to continuously monitor the depression of said brake pedal, the steering angle of said steering wheel, the rotational speeds of said wheels of said drive axles, and the rotational speeds at the inputs of the drive axles, and to control the operation of the dual-rotor motor as an electric braking generator and the operation of said wheel brakes actuator, and wherein the central electronic controller is further programmed:

(a) to operate the dual-rotor motor as an electric braking generator for maintaining the speed of the vehicle substantially constant and charging the electric battery when the vehicle is moving forward with a speed lower than said first predetermined speed, said accelerator pedal is not depressed, and an acceleration of the vehicle is detected;

(b) to disengage the clutch, to operate the internal-combustion engine at said substantially constant rotational speed, and to operate the dual-rotor motor as an electric braking generator for maintaining the speed of the vehicle substantially constant and charging the electric battery when the vehicle is moving forward with a speed higher than the first predetermined speed, the accelerator pedal is not depressed, and an acceleration of the vehicle is detected;

(c) when the vehicle is moving forward with a speed lower than the first predetermined speed and said brake pedal is depressed:

(i) to operate the dual-rotor motor as an electric braking generator when in response to the depression of the brake pedal the dual-rotor motor alone while charging the electric battery provides a continuously variable braking force capable of sustaining the vehicle speed during speed retardation or of decelerating the vehicle to a lower desirable speed during braking;

(ii) to operate the dual-rotor motor as an electric braking generator and, when in response to the depression of the brake pedal the dual-rotor motor alone does not provide a continuously variable braking force capable of sustaining the vehicle speed during speed retardation or of decelerating the vehicle to a lower desirable speed during braking, to gradually apply said wheel brakes and then to control the continuously variable braking force of the wheel brakes in response to the depression of the brake pedal;

(iii) to discontinue the operation of the dual-rotor motor as an electric braking generator regardless of the depression of the brake pedal and to brake the vehicle only via the wheel brakes in response to the depression of the brake pedal when a pending lockup of any of said driving wheels of the vehicle is detected; and (iv) to brake the vehicle only via the wheel brakes in response to the depression of the brake pedal when the electric battery is fully charged;

(d) when the vehicle is moving forward with a speed higher than the first predetermined speed and the brake pedal is depressed, to disengage the clutch, to operate the internal-combustion engine at the predetermined substantially constant speed, and:

(i) to operate the dual-rotor motor as an electric braking generator when in response to the depression of the brake pedal the dual-rotor motor alone while charging the electric battery provides a continuously variable braking force capable of sustaining the vehicle speed during speed retardation or of decelerating the vehicle to a lower desirable speed during braking;

(ii) to operate the dual-rotor motor as an electric braking generator and, when in response to the depression of the brake pedal the dual-rotor motor alone does not provide a continuously variable braking force capable of sustaining the vehicle speed during speed retardation or of decelerating the vehicle to a lower desirable speed during braking, to gradually apply the wheel brakes and then to control the continuously variable braking force of the wheel brakes in response to the depression of the brake pedal;

(iii) to discontinue the operation of the dual-rotor motor as an electric braking generator regardless of the depression of the brake pedal and to brake the vehicle only via the wheel brakes in response to the depression of the brake pedal when a pending lockup of any of the driving wheels of the vehicle is detected; and (iv) to brake the vehicle only via the wheel brakes in response to the depression of the brake pedal when the electric battery is fully charged; and (e) when the vehicle is not moving or is moving backward, to apply the wheel brakes in response to the depression of the brake pedal.

19. A method for operating a vehicle comprising a first drive axle including two wheels for driving said vehicle and a second drive axle including two wheels for driving the vehicle, wherein the wheels of at least one of said two drive axles are also steerable for steering the vehicle, said method for operating a vehicle comprising the steps of:

driving the vehicle in a forward/low-speed/four-wheel-drive mode at speeds lower than a predetermined speed of the vehicle via a dual-rotor electric traction motor including a first rotor for driving said wheels of said first drive axle and a second rotor for driving said wheels of said second drive axle, wherein when said dual-rotor motor is energized said two rotors are propelled to rotate in opposite directions under the action of the same electromagnetic forces;

driving the vehicle in a forward/high-speed/two-wheel-drive mode at speeds higher than said predetermined speed via an internal-combustion engine, driving the wheels of the first drive axle, when said internal-combustion engine alone is capable to sustain the vehicle speed or to accelerate the vehicle to a higher speed;

driving the vehicle in a forward/high-speed/four-wheel-drive mode at speeds higher than the predetermined speed via both the internal-combustion engine and the dual-rotor motor, wherein the internal-combustion engine drives the wheels of the first drive axle while the dual-rotor motor drives the wheels of the first and second drive axles, when the internal-combustion engine alone is not capable of sustaining the vehicle speed or of accelerating the vehicle to a higher speed;

driving the vehicle in a reverse/four-wheel-drive mode via the dual-rotor motor, wherein said opposite direction of rotation of both rotors are reversed;

interrupting the transmission of mechanical energy between the internal-combustion engine and the wheels of the first drive axle via a clutch when the vehicle does not move, when the vehicle operates in said forward/low-speed/four-wheel-drive mode, and when the vehicle operates in said reverse/four-wheel-drive mode;

supplying the dual-rotor motor with electric energy from an electric power source including an electric battery for storing electric energy and selectively supplying the dual-rotor motor with electric energy and an electric generator for charging said electric battery and selectively supplying the dual-rotor motor with electric energy, wherein said electric generator is driven by the internal-combustion engine;

controlling and coordinating the operation of the dual-rotor motor, internal-combustion engine, and said clutch via a central electronic controller for driving the vehicle in said drive modes and charging the electric battery;

controlling the continuously variable tractive force of the vehicle in each of said drive modes only via the depression of an accelerator pedal controllable by the operator of the vehicle and continuously monitored by said central electronic controller.

20. A method for operating a vehicle according to claim 19, and further comprising the step of:
   transmitting mechanical energy between said first rotor and said wheels of said first drive axle via a first mechanical drive train;
   transmitting mechanical energy between said second rotor and said wheels of said second drive axle via a second mechanical drive train;
   transmitting mechanical energy between said internal-combustion engine and the wheels of the first drive axle via a third mechanical drive train including said clutch and a part of said first drive train; and
   transmitting mechanical energy between the internal-combustion engine and said electric generator via a fourth mechanical drive train.

21. A method for operating a vehicle according to claim 19, and further comprising the steps of:
   selectively operating said electric generator as an electric motor powered by said electric battery for starting said internal-combustion engine, and
   controlling the selective operation of the electric generator as an electric motor via said central electronic controller.

22. A method for operating a vehicle according to claim 19, and further comprising the steps of:
   selectively operating said electric generator as an electric traction motor powered by said electric battery for driving the wheels of said first drive axle, and
   controlling the selective operation of the electric generator as an electric traction motor via sad central electronic controller.

23. A method for operating a vehicle according to claim 19, and further comprising the steps of:
   selectively operating said dual-rotor motor as an electric braking generator driven by the kinetic energy of the vehicle during speed retardation and braking of the vehicle for charging of said electric battery, and
   controlling the selective operation of the dual-rotor motor as an electric braking generator via said central electronic controller.

24. A method for operating a vehicle according to claim 23, and further comprising the steps of:
   controlling the continuously variable braking force of the vehicle by the depression of a brake pedal controllable by the operator of the vehicle and continuously monitored by said central electronic controller, wherein the central electronic controller further continuously monitor the rotational behavior of said vehicle driving wheels;
   disengaging said clutch during speed retardation and braking of the vehicle;
   braking the vehicle via said dual-rotor motor operating as an electric braking generator when in response to the depression of said brake pedal the dual-rotor motor alone while charging the electric battery provides a continuously variable braking force capable of sustaining the vehicle speed during speed retardation or of decelerating the vehicle to a lower desirable speed during braking;
   braking the vehicle by operating the dual-rotor motor as an electric braking generator and simultaneously applying vehicle wheel brakes, controllable by the central electronic controller, when in response to the depression of the brake pedal the dual-rotor motor alone does not provide a continuously variable braking force capable of sustaining the vehicle speed during speed retardation or of decelerating the vehicle to a lower desirable speed during braking; and
   discontinuing the operation of the dual-rotor motor as an electric braking generator regardless of the depression of the brake pedal and braking the vehicle only via the wheel brakes in response to the depression of the brake pedal, under any of the following conditions:
   (i) when a pending lockup of any of said driving wheels of the vehicle is detected;
   (ii) when said electric battery is fully charged;
   (iii) when the vehicle is moving backward; and
   (iv) when the vehicle is not moving.

* * * * *